(12) United States Patent
Aramaki et al.

(10) Patent No.: US 6,506,826 B1
(45) Date of Patent: Jan. 14, 2003

(54) POLYAMIDE RESIN COMPOSITION AND PROCESS FOR PRODUCING THE SAME

(75) Inventors: Masaaki Aramaki, Nobeoka (JP); Katsushi Watanabe, Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/529,965

(22) PCT Filed: Jul. 7, 1999

(86) PCT No.: PCT/JP99/03657
§ 371 (c)(1),
(2), (4) Date: Apr. 24, 2000

(87) PCT Pub. No.: WO00/11088
PCT Pub. Date: Mar. 2, 2000

(30) Foreign Application Priority Data

Aug. 24, 1998 (JP) .......................................... 10-237373

(51) Int. Cl.⁷ ................................................ C08K 3/32
(52) U.S. Cl. ..................................... 524/415; 524/417
(58) Field of Search .................................. 524/415, 417

(56) References Cited

U.S. PATENT DOCUMENTS

| | | | | |
|---|---|---|---|---|
| 4,222,128 A | * | 9/1980 | Tomonaga | .................... 3/1.9 |
| 4,433,958 A | * | 2/1984 | Fellman | .................... 433/199 |
| 5,092,890 A | * | 3/1992 | Pohlemann | .................... 623/1 |
| 5,122,418 A | * | 6/1992 | Nakane | .................... 424/401 |
| 5,721,281 A | * | 2/1998 | Blount | .................... 521/50 |
| 6,180,548 B1 | * | 1/2001 | Taoda | .................... 501/137 |
| 6,187,192 B1 | * | 2/2001 | Johnston | .................... 210/502.1 |

FOREIGN PATENT DOCUMENTS

| | | |
|---|---|---|
| JP | A63132810 | 6/1988 |
| JP | A1501289 | 5/1989 |
| JP | A2234763 | 9/1990 |
| JP | A3217454 | 9/1991 |
| JP | A11199771 | 7/1999 |

* cited by examiner

Primary Examiner—Edward J. Cain
(74) Attorney, Agent, or Firm—Birch, Stewart, Kolasch & Birch, LLP

(57) ABSTRACT

A polyamide resin composition which contains 0.5 to 50 wt. % of an apatite type compound and which, when eluted with a phenol solvent and filtered, leaves 1 to 100 parts by weight of residual organic substances per 100 parts by weight of the apatite type compound has high strength and rigidity and is excellent in toughness. Moreover, the composition is reduced in water absorption and warpage and is excellent in rigidity upon water absorption, heat resistance, creep resistance, dimensional stability and moldability. Thus, the composition is suitable for use as an industrial material for producing mechanical parts, electrical/electronic parts, etc.

19 Claims, 4 Drawing Sheets

POLYAMIDE RESIN COMPOSITION AND PROCESS FOR PRODUCING THE SAME

This application is the national phase under 35 U.S.C. § 371 of PCT International Application No. PCT/JP99/03657 which has an International filing date of Jul. 7, 1999, which designated the United States of America.

TECHNICAL FIELD

The present invention relates to a polyamide resin composition comprising a polyamide and an apatite type compound, having high strength and rigidity and is excellent in toughness so as to be suitably used as industrial materials for various mechanical parts and electrical/electronic parts, etc. and further being reduced in water absorption and warpage and excellent in rigidity upon water absorption, heat resistance, creep resistance, dimensional stability and moldability. The present invention also relates to a preparation process of the polyamide resin composition.

BACKGROUND ART

In order to improve the strength or rigidity which a polyamide resin originally has, it has been a common practice to incorporate, into a polyamide resin, various fillers including, for example, inorganic fibers such as glass fibers or carbon fibers, inorganic compounds such as calcium carbonate, mica or talc, or layered compounds such as montmorillonite and swelling fluorine mica. Although being effective for improving the strength or rigidity of the molded product of the resulting resin composition, these means are accompanied with the drawback that toughness which is another characteristic of the polyamide resin is markedly impaired owing to low affinity of the polyamide with a filler. JP-A-3-217454 (the term "JP-A" as used herein means an "unexamined published Japanese patent application), discloses a polyamide resin composition comprising 100 parts by weight of a polyamide and 5 to 300 parts by weight of apatite aiming at obtaining a material having a touch feeling close to ivory. This composition is improved in strength and rigidity of the resulting molded product similar to the above-described compositions having a filler added thereto, but markedly low affinity at the interface between the polyamide and apatite causes a drastic decrease in toughness, that is, decrease in tensile elongation, which makes it difficult to use it as an industrial material.

Thus, reinforcement of a polyamide resin with various inorganic fillers has been proposed for the purpose of improving the strength and rigidity of a polyamide resin. Conventional proposals are however not fully satisfactory, because they cause a marked decrease in toughness, that is, tensile elongation, which imposes a limitation on the application of the polyamide resins. Accordingly, there is a demand for the development of a polyamide resin composition which has improved rigidity and strength without causing decrease in toughness.

An object of the present invention is to provide a polyamide resin composition which can overcome the above-described problems which have so far remained unsolved, in other words, a composition which has high strength and rigidity, while having excellent toughness, and moreover, which is reduced in water absorption and warpage and excellent in rigidity upon water absorption, heat resistance, creep resistance, dimensional stability and moldability.

DISCLOSURE OF THE INVENTION

To solve the above-described problems, the present inventors carried out an extensive investigation. As a result, it has been found that the above-described object can be accomplished by a specific polyamide composition obtained by incorporating a predetermined amount of an apatite type compound into a polyamide. Thus, the present invention has been completed.

That is, the present invention related to the following polyamide compositions (1) to (9) and preparation processes (10) to (18) therefor.

(1) A polyamide resin composition which contains 0.5 to 50 wt. % of an apatite type compound and which, when eluted with a phenol solvent and filtered, leaves 1 to 100 parts by weight of residual organic substances per 100 parts by weight of said apatite type compound.

(2) The polyamide resin composition according to the above item (1), wherein said polyamide has a weight-average molecular weight of 10,000 to 1,000,000.

(3) The polyamide resin composition according to the above item (1), wherein said organic substances comprise at least a polyamide.

(4) The polyamide resin composition according to the above item (1), wherein said apatite type compound has an average particle size not greater than 1 $\mu$m.

(5) The polyamide resin composition according to the above item (1), wherein the molar ratio of the metal element (s) to phosphorus, both constituting the apatite type compound, is from 0.9 to 10.0.

(6) The polyamide resin composition according to any one of the above items (1) to (5), wherein said apatite type compound is a crystalline apatite compound which has a (002) plane peak at a diffraction angle (2θ) of 25.5° to 26.5° and a (300) plane peak at a diffraction angle (2θ) of 32.5° to 33.5° as observed by wide-angle X-rays (CuKα: wavelength λ=1.542 Å) scattering.

(7) The polyamide resin composition according to any one of the above items (1) to (5), wherein said apatite type compound is represented by the following formula:

$$A_{10-z}(HPO_4)_z(PO_4)_{6-z}(X)_{2-z} \cdot nH_2O$$

wherein 0≦z<2, 0≦n≦16, A represents a metal element and X represents an anion or an anionic compound.

(8) The polyamide resin composition according to the above item (5), wherein the metal element is at least one metal in Group 2A of the periodic table.

(9) The polyamide resin composition according to the above item (5), wherein the metal element is calcium.

(10) A process for preparing a polyamide resin composition, which comprises mixing a polyamide-forming component with an apatite type compound-forming component, allowing to proceed polymerization of a polyamide and synthesis of an apatite type compound, to give a composition in which an apatite type compound having an average particle size not greater than 1 $\mu$m is dispersed in a polyamide having a weight-average molecular weight of 10,000 to 1,000,000.

(11) The process for preparing a polyamide composition according to the above item (10), wherein said polyamide-forming component comprises at least one selected from the group consisting of polymerizable amino acids, polymerizable lactams, and polymerizable salts of diamines and dicarboxylic acids, and polymerizable oligomers of these compounds.

(12) The process for preparing a polyamide resin composition according to the above item (10), wherein said apatite type compound-forming component comprises a phosphoric acid-based metal compound or a mixture of a phosphoric acid-based metal compound and a non-phosphoric acid-based metal compound.

(13) The process for preparing a polyamide resin composition according to the above item (10), wherein the molar ratio of the metal element(s) to phosphorus in said apatite type compound-forming component is from 0.9 to 10.

(14) The process for preparing a polyamide resin composition according to the above item (10), wherein said apatite type compound is a crystalline apatite compound having a (002) plane peak at a diffraction angle (2θ) of 25.5° to 26.5° and a (300) plane peak at a diffraction angle (2θ) of 32.5° to 33.5° as observed by wide-angle X-ray (CuKα: wavelength λ=1.542 Å) scattering.

(15) The process for preparing a polyamide resin composition according to the above item (10), wherein said apatite type compound is represented by the following formula:

$A_{10-z}(HPO_4)_z(PO_4)_{6-z}(X)_{2-z'} \cdot nH_2O$ wherein $0 \leq z < 2$, $0 \leq n \leq 16$, a represents a metal element and X represents an anion or an anionic compound.

(16) The process for preparing a polyamide resin composition according to the above item (12) or (13), wherein the metal element is at least one metal in Group 2A of the periodic table.

(17) The process for preparing a polyamide resin composition according to the above item (12) or (13), wherein the metal element is calcium.

(18) The process for preparing a polyamide resin composition according to the above item (10), wherein said polymerization of the polyamide and said synthesis of the apatite-type compound are carried out at a temperature of 40° C. to 300° C.

BEST MODE FOR CARRYING OUT THE INVENTION

Figure 1:
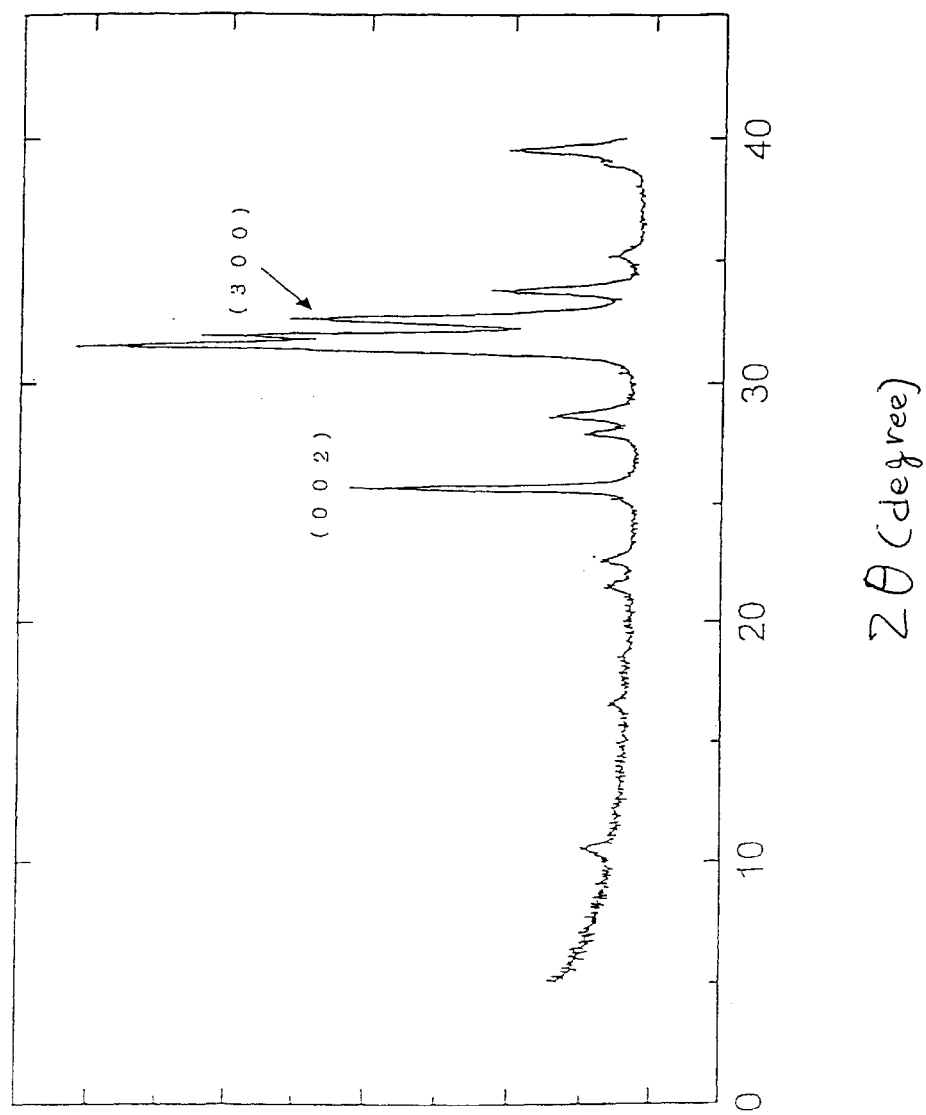
FIG. 1 illustrates the measurement results of wide-angle X-ray diffraction of the apatite type compound separated from the composition of Example 1.

The present invention relates to a polyamide resin composition obtained by incorporating an apatite type compound in a polyamide.

The polyamide for use in the present invention may be any polymer having an amide bond (—NHCO—) in the main chain thereof. Examples of the polyamide preferably employed in the present invention include polycaprolactam (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecalactam (nylon 11), polydodecalactam (nylon 12), polytrimethylhexamethylene terephthalamide (nylon TMHT), polyhexamethylene isophthalamide (nylon 6I), polynonanemethylene terephthalamide (9T), polyhexamethylene terephthalamide (6T), polybis(4-aminocyclohexyl)methane dodecamide (nylon PACM12), polybis(3-methylaminocyclohexyl)methane dodecamide (nylondimethyl PACM12), polymethaxylylene adipamide (nylon MXD6) and polyundecamethylene hexahydroterephthalamide (nylon 11T(H)) and polyamide copolymers each containing at least two different polyamide components selected from the above-exemplified ones, and mixtures thereof.

Examples of a component (raw material) for forming the above-exemplified polyamides include polymerizable amino acids, polymerizable lactams and polymerizable salts of diamines and dicarboxylic acids, and polymerizable oligomers of these compounds.

Specific examples of the polymerizable amino acid include 6-aminocaproic acid, 11-aminoundecanoic acid, 12-aminododecanoic acid and para-aminomethylbenzoic acid. In the present invention, these polymerizable amino acids may be used either singly or in combination.

Specific examples of the polymerizable lactam include butyllactam, pivalolactam, caprolactam, capryllactam, enantholactam, undecanolactam and dodecanolactam. In the present invention, these polymerizable lactams may be used either singly or in combination.

Specific examples of the diamine of the polymerizable salts of diamines and dicarboxylic acids include tetramethylenediamine, hexamethylenediamine, undecamethylenediamine, dodecamethylenediamine, 2-methylpentamethylenediamine, nonanemethylenediamine, 2,2,4-trimethylhexamethylenediamine, 2,4,4-trimethylhexamethylenediamine, 5-methylnonamethylenediamine, 2,4-dimethyloctamethylenediamine, metaxylylenediamine, paraxylylenediamine, 1,3-bis(aminomethyl)cyclohexane, 3,8-bis(aminomethyl)tricyclodecane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine and aminoethylpiperazine. In the present invention, these polymerizable lactams may be used either singly or in combination.

Specific examples of the dicarboxylic acid of the polymerizable salts of diamines and dicarboxylic acids include malonic acid, dimethylmalonic acid, succinic acid, glutaric acid, adipic acid, 2-methyladpic acid, trimethyladipic acid, pimelic acid, 2,2-dimethylglutaric acid, 3,3-diethylsuccinic acid, azelaic acid, sebacic acid, suberic acid, dodecanedioic acid, eicodionic acid, terephthalic acid, isophthalic acid, naphthalenedicarboxylic acid, 2-chloroterephthalic acid, 2-methylterephthalic acid, 5-methylisophthalic acid, 5-sodium sulfoisophthalic acid, hexahydroterephthalic acid, hexahydroterephthalic acid and diglycolic acid. In the present invention, these polymerizable dicarboxylic acids may be used either singly or in combination.

To the polyamide-forming component (raw material) for use in the present invention, it is possible to add a known termination sealing agent in order to adjust the molecular weight or improve resistance to hot water. As the termination sealing agent, monocarboxylic acids and monoamines are preferred. Additional examples include acid anhydrides such as phthalic anhydride, monoisocyanates, monoacid halides, monoesters and monoalcohols.

No particular limitation imposed on the monocarboxylic acid which can be used as a termination sealing agent insofar as it has reactivity with an amino group. Examples include aliphatic monocarboxylic acids such as acetic acid, propionic acid, butyric acid, valeric acid, n-caproic acid, n-capric acid, lauric acid, tridecylic acid, myristic acid, palmitic acid, stearic acid, pivalic acid and isobutyric acid, alicyclic monocarboxylic acids such as cyclohexanecarboxylic acid, and aromatic monocarboxylic acids such as benzoic acid, toluic acid, α-naphthalenecarboxylic acid, β-naphthalenecarboxylic acid, methylnaphthalenecarboxylic acid and phenylacetic acid. In the present invention, these monocarboxylic acids may be used either singly or in combination.

No particular limitation is imposed on the monoamine to be used as a termination sealing agent insofar as it has reactivity with a carboxyl group. Examples include aliphatic monoamines such as methylamine, ethylamine, propylamine, butylamine, hexylamine, octylamine, decylamine, stearylamine, dimethylamine, diethylamine, dipropylamine and dibutylamine, aliphatic monoamines such as cyclohexylamine and dicyclohexylamine and aromatic monoamines such as aniline, toluidine, diphenylamine and naphthylamine. In the present invention, these monoamines may be used either singly or in combination.

The molecular weight of the polyamide in the polyamide resin composition of the present invention is preferably 10,000 to 1,000,000 as a weight-average molecular weight (Mw) from the viewpoints of excellent moldability and physical properties, with 20,000 to 200,000 being particularly preferred. The weight-average molecular weight can be determined from gel permeation chromatography (GPC) by using hexafluoroisopropanol (HFIP) as a solvent and polymethyl methacrylate (PMMA) as a standard sample for molecular weight.

The apatite type compound preferably used in the present invention is represented by the following formula:

$$A_{10-z}(HPO_4)_z(PO_4)_{6-z}(X)_{2-z} \cdot nH_2O$$

In the above formula, $0 \leq z < 2$, $0 \leq n \leq 16$, A represents a metal element and X represents an anion or an anionic compound. In consideration of moldability and physical properties, it is more preferred that $0 \leq z \leq 1$ and $0 \leq n \leq 4$.

Preferred examples of the metal element A include elements of Groups 1A, 2A, 3A, 4A, 5A, 6A, 7A, 8, 1B, 2B and 3B of the periodic table, tin and lead. These metal elements may be used either singly or in combination. In the present invention, magnesium, calcium, strontium and barium which are metals in Group 2A and mixture of at least two of them are particularly preferred from the viewpoints of economy, safety and physical properties of the resulting resin composition.

As the anion or anionic compound represented by X in the above-described formula, hydroxyl ion (OH$^-$), fluorine ion (F$^-$) and chlorine ion (Cl$^-$) can be mentioned as examples. Anionic ion elements or anionic ion compounds may be used either singly or in combination. The apatite type compound of the present invention may be a carbonic-acid-containing apatite obtained by substituting the hydrogenphosphate ion (HPO$_4^{2-}$), phosphoric acid ion (PO$_4^{3-}$) or part of X in the above-described formula with a carbonic acid ion (CO$_3^{2-}$).

Among the above-described apatite type compounds, hydroxy apatite (X representing a hydroxy ion), fluorinated apatite (a part or whole of X representing a fluorine ion), chlorinated apatite (a part or whole of X representing a chlorine ion), a carbonic-acid-containing hydroxy apatite, carbonic-acid-containing fluorinated apatite and carbonic-acid-containing chlorinated apatite and mixtures thereof, each containing calcium as the metal element A are used most preferably in the present invention.

Examples of the component (raw material) for forming such an apatite type compound include phosphoric acid-based metal compounds and mixtures of a phosphoric acid-based metal compound and a non-phosphoric acid-based metal compound. In the present invention, mixtures of a phosphoric acid-based metal compound and a non-phosphoric acid-based metal compound are more preferred. In the present invention, a molar ratio of the metal element to phosphorus of the apatite type compound-forming component may fall within a range of from 0.9 to 10.0, more preferably from 1.2 to 5.0, still more preferably from 1.5 to 2.0.

Examples of the phosphoric acid of the above-described phosphoric acid-based metal compound include orthophosphoric acid, pyrophosphoric acid, tripolyphosphoric acid, metaphosphoric acid, phosphorous acid and hypophosphorous acid.

Specific examples of the phosphoric acid-based metal compound include calcium monohydrogenphosphate (CaHPO$_4 \cdot$mH$_2$O, with the proviso that $0 \leq m \leq 2$), calcium dihydrogendiphosphate (CaH$_2$P$_2$O$_7$), calcium bis (dihydrogenphosphate) monohydrate (Ca(H$_2$PO$_4$)$_2 \cdot$H$_2$O), calcium diphosphate (α- and β-Ca$_2$P$_2$O$_7$), tricalcium phosphate (α- and β-Ca$_3$(PO$_4$)$_2$), tetracalcium phosphate (Ca$_4$(PO$_4$)$_2$O), octacalcium phosphate pentahydrate (Ca$_8$H$_2$(PO$_4$)$_6 \cdot$5H$_2$O), calcium phosphite monohydrate (CaHPO$_3 \cdot$H$_2$O), calcium hypophosphite (Ca(H$_2$PO$_2$)$_2$), magnesium phosphate dibasic trihydrate (MgHPO$_4 \cdot$3H$_2$O), magnesium phosphate tribasic octahydrate (Mg$_3$(PO$_4$)$_2 \cdot$8H$_2$O) and barium phosphate dibasic (BaHPO$_4$). Among them, compounds of phosphoric acid and calcium are preferably employed in the present invention for excellent economy and physical properties, with calcium monohydrogen phosphate (CaHP$_4$O$\cdot$mH$_2$O with the proviso that $0 \leq m \leq 2$) being more preferred. Particularly, anhydrous calcium monohydrogen phosphate (CaHPO$_4$) and calcium monohydrogenphosphate dihydrate (CaHPO$_4 \cdot$2H$_2$O) are most preferably employed. These phosphorus-base metal compounds may be used either singly or in combination. When they are used in combination, combination of compounds containing same kinds of metal elements such as combination of calcium monohydrogenphosphate dihydrate (CaHPO$_4 \cdot$2H$_2$O) and calcium dihydrogendiphosphate (CaH$_2$P$_2$O$_7$) and combination of compounds containing different kinds of metal elements, such as combination of calcium monohydrogenphosphate dihydrate (CaHPO$_4 \cdot$2H$_2$O) and magnesium phosphate dibasic trihydrate (MgHPO$_4 \cdot$3 H$_2$O) can be mentioned as examples. Either can be used without any problem.

The phosphoric acid-based metal compound for use in the present invention, for example, calcium monohydrogenphosphate (CaHP$_4$O$\cdot$mH$_2$O with the proviso that $0 \leq m \leq 2$) is available by a known process by mixing a phosphoric acid compound and a calcium compound in the presence of water as illustrated in the state diagram of CaO—H$_2$O—P$_2$O$_5$ system described in "Phosphorus and its Compounds, 1(1958) by Van Wazer. Described specifically, such a compound may be obtained by adding an alkali phosphate solution and a calcium chloride solution dropwise to a solution of potassium dihydrogenphosphate, thereby reacting them; or mixing calcium carbonate or calcium hydroxide with an aqueous solution of phosphoric acid.

The present inventors presume that use of a compound comprising arsenic (As) or vanadium (V), that is, arsenic acids or vanadiums instead of the above-exemplified phosphoric acids bring about similar effects. In the present invention, however, use of phosphoric acids is most preferred because they are excellent in stability of the compound, availability of raw material components and safety.

No particular limitation is imposed on the non-phosphoric acid-based metal compounds for use in the present invention insofar as they are compounds other than the above-exemplified phosphoric acids and capable of forming compounds with a metal element. Examples include inorganic metal compounds, e.g., metal hydroxides (such as calcium hydroxide, magnesium hydroxide, strontium hydroxide, barium hydroxide, lithium hydroxide, sodium hydroxide, potassium hydroxide, aluminum hydroxide, iron hydroxide and manganese hydroxide); metal chlorides (such as calcium chloride, magnesium chloride, strontium chloride, barium chloride, lithium chloride, sodium chloride, potassium chloride, aluminum chloride, iron chloride and manganese chloride); metal fluorides (such as calcium fluoride, magnesium fluoride, barium fluoride, strontium fluoride, lithium fluoride, sodium fluoride, potassium fluoride and aluminum fluoride), metal bromides (such as calcium bromide), metal iodides (calcium iodide, potassium iodide and copper iodide), metal carbides (such as calcium carbide), metal oxides (such as calcium oxide and magnesium oxide), metal carbonates (such as calcium carbonate, magnesium carbonate, strontium carbonate, barium carbonate, lithium carbonate, sodium carbonate, potassium carbonate and aluminum carbonate), metal sulfates (such as calcium sulfate), metal nitrates (such as calcium nitrate) and metal silicates (calcium silicate and sodium hexafluorosilicate); compounds of a metal element and a monocarboxylic acid (such as calcium acetate, copper acetate, calcium benzoate and calcium stearate); compounds of a metal element and a dicarboxylic acid (such as calcium oxalate and calcium tartrate) and compounds of a metal element and a tricarboxylic acid (such as calcium citrate). In the present invention, these non-phosphoric acid-based metal compounds may be used either singly or in combination. When at least two of them are combined, compounds containing same metal elements, for example, calcium hydroxide and calcium carbonate, may be mixed or compounds containing different metal elements, for example, calcium carbonate and magnesium hydroxide, may be mixed. Among these compounds, metal hydroxides, metal fluorides, metal chlorides, metal carbonates and metal oxides and mixtures thereof are preferably used because of excellent economy and physical properties. Particularly, hydroxides, fluorides, chlorides and carbonates of a metal belonging to Group 2A of the periodic table such as calcium, magnesium, strontium or barium and mixtures thereof are more preferred, with hydroxides, fluorides, chlorides, carbonates and oxides of calcium and mixtures thereof being most preferably employed.

The phosphoric acid-based metal compound or non-phosphoric acid-based metal compound, which is the apatite type compound-forming component of the present invention preferably has an average particle size of 100 $\mu$m or less, more preferably 50 $\mu$m or less and still more preferably 25 $\mu$m or less. The average particle size may be determined by a laser diffraction/scattering type particle size distributor or by observation through a scanning electronic microscopy by using the dispersion of the apatite type compound-forming component in pure water or an alcohol.

The polyamide resin composition of the present invention may be obtained by incorporating an apatite type compound-forming component (raw material) in a polyamide-forming component (another raw material), followed by polymerization of a polyamide and synthesis of an apatite type compound. The polymerization of a polyamide and synthesis of an apatite type compound are preferably carried out by heating the mixture of the polyamide-forming component and apatite type compound-forming component, polymerizing the polyamide-forming component in the presence of the apatite type compound-forming component and then synthesizing the apatite-type compound; or reacting the apatite-type-forming component in the presence of the polyamide-forming component and then polymerizing the polyamide. More preferred is a process to allow the polymerization of the polyamide and synthesis of the apatite type compound to proceed at 40 to 300° C., of which the most preferred is a process to allow the polymerization of the polyamide and synthesis of the apatite type compound to proceed simultaneously at 40 to 300° C. under pressure.

The mixture of the polyamide-forming component and apatite type compound-forming component may be obtained either by directly mixing the polyamide-forming component in a solid form and the apatite type compound-forming component or mixing an aqueous solution of the polyamide-forming component and an aqueous solution or suspension of the apatite type compound-forming component. In order to improve the dispersibility of the apatite type compound, a compound such as dispersant or complexing agent may be added to the polyamide-forming component or apatite type compound-forming component as needed.

In the present invention, no particular limitation is imposed on the nature of the above-described dispersant and any known dispersant can be employed. For example, anionic surfactants, cationic surfactants, amphoteric surfactants, nonionic surfactants and nonionic surfactants as described in pp. 232 to 237 of "Elucidation of Dispersion. Coagulation and Applied Technique, 1992" (ed. by Fumio Kitahara, published by Techno System Co., Ltd.). Among them, anionic surfactants and nonionic surfactants are preferred. From the viewpoints of cost and physical properties, sodium citrate, sodium polyacrylate, ammonium polyacrylate, styrene-maleic anhydride copolymer, olefin-maleic anhydride copolymers such as ethylene-maleic anhydride copolymer and sucrose esters such as sucrose stearate are more preferred.

No particular limitation is imposed on the complexing agent insofar as it is a compound forming a complex with a metal ion. Examples include ethylenediaminetetraacetic acid (EDTA), nitrilotriacetic acid, cyclohexanediaminetetraacetic acid, glycoletherdiaminetetraacetate, diethylenetriaminepentaacetic acid, citric acid, gluconic acid, tartaric acid, malic acid, succinic acid, aliphatic amines such as ethylenediamine and urea. Among them, citric acid, ethylenediaminetetraacetic acid (EDTA) and ethylenediamine (en) are particularly preferred from the viewpoints of cost and physical properties.

For the polymerization of the polyamide, any known process can be employed. For example, usable is a process in which a component sparingly soluble in water such as 11-aminoundecanoic acid, which is employed as a forming component, is polycondensed by heating at 40 to 300° C.; a ring-opening polycondensation process in which an aqueous solution of $\epsilon$-caprolactam, which is employed as a forming component, is added with a termination sealing agent such as a monocarboxylic acid or reaction accelerator such as $\epsilon$-aminocaproic acid as needed and polycondensation of the resulting mixture is effected by heating it to 40 to 300° C. under the flow of an inert gas; or a heat-fusion polycondensation process in which an aqueous solution of a salt of a diamine and a dicarboxylic acid such as hexamethylene adipamide, which is employed as a forming component, is concentrated under heat at 40 to 300° C., the water vapor thus generated is maintained between normal pressure to 20 atmospheric pressure and then after release of the pressure, polycondensation is effected under normal or reduced pressure. Alternatively, solid-phase polymerization in which polymerization is carried out at a temperature not greater than the melting point of a solid salt of a diamine and a dicarboxylic acid or that of a polycondensate thereof; or solution polymerization in which a dicarboxylic acid halide component and a diamine component are polycondensed in a solution. The above-exemplified processes may be used in combination if necessary. The polymerization may be conducted either in a batchwise or continuous manner. No particular limitation is imposed on the polymerization apparatus and a known one such as autoclave-type reactor, tumbler type reactor or extrusion type reactor such as kneader can be employed.

The apatite type compound contained in the polyamide resin composition of the present invention may be confirmed directly by subjecting pellets or molded product of the composition to wide-angle X-ray diffraction or infrared absorption spectrum or by dipping the pellets or molded product in a solvent, such as phenol, in which the polyamide is soluble to elute the polyamide resin and subjecting the remaining component thus separated to wide-angle X-ray diffraction or infrared absorption spectrum.

Although the apatite type compound contained in the polyamide resin composition of the present invention may be either crystalline or amorphous, the crystalline one is more preferred from the viewpoint of physical properties. By subjecting the pellets or molded product to wide-angle X-ray diffraction, the apatite-type compound contained therein can be confirmed to be crystalline or amorphous. It is also possible to confirm it by dipping the pellets or molded product in a solvent, such as phenol, in which the polyamide is soluble, to elute the polyamide resin and subjecting the remaining component thus separated to wide-angle X-ray diffraction. Described more specifically, wide-angle X-ray diffraction of the above-described separated component is measured using copper Kα (wavelength λ=1.542 Å) as a radiation source of X-ray and if there exist a (002) plane peak at a diffraction angle (2θ) of 25.5 to 26.5° and a (300) plane peak at a diffraction angle (2θ) of 32.5 to 33.5°, the apatite type compound is confirmed to be crystalline. In the present invention, a crystalline apatite type compound thus confirmed is particularly preferred.

The content of the apatite type compound must be 0.5 to 50 wt. %, preferably 2.5 to 40 wt. %, particularly preferably 5 to 30 wt. % in the polyamide resin composition. The content of the apatite type compound can be determined from an ignition loss of the pellets or molded product measured in accordance with JIS R3420. Described specifically, the content of the apatite type compound is determined by drying the polyamide resin composition sufficiently, weighing about 1 g of it on a platinum boat, incinerating it in an electric oven of 650±20° C., cooling and then weighing the amount of it. When the content of the apatite type compound is less than 0.5 wt. %, the rigidity and strength of the resulting composition are not improved enough to satisfy the object of the present invention. Contents exceeding 50 wt. %, on the other hand, tend to cause a problem such as difficulty in extrusion or molding.

In the apatite type compound of the present invention, a molar ratio of the metal element to phosphorus preferably ranges from 0.9 to 10.0, more preferably from 1.2 to 5.0, particularly preferably from 1.3 to 2.0. A description will next be made of the determination of the amount of calcium as the metal element. First, 0.5 g of a polyamide resin composition is weighed on a platinum boat and it is incinerated at 500° C. in an electric oven. After cooling, 5 ml of hydrochloric acid and 5 ml of pure water are added to the resulting carbide and the latter was dissolved in the former two by boiling on a heater. After cooling again, pure water was added to the resulting solution to make it 500 ml. Calcium in the sample thus obtained may quantitatively be determined by inductively coupled plasma (ICP) emission spectrometry (characteristic wavelength: 317.933 nm). Another metal element can also be quantitatively determined in a similar manner by applying thereto a corresponding characteristic wavelength selected. The amount of phosphorus, on the other hand, may be determined as follows: 0.5 g of the polyamide resin composition is weighed, to which 20 ml of concentrated sulfuric acid is added. The resulting mixture is wet decomposed on a heater. After cooling, 5 ml of hydrogen peroxide is added and the resulting mixture is heated on a heater to concentrate the whole amount to 2 to 3 ml. After cooling again, the concentrate is adjusted to 500 ml with pure water, followed by inductively coupled plasma (ICP) emission spectrometry (characteristic wavelength: 213.618 nm). Based on the results thus determined, a molar ratio of the metal element to phosphorus can be calculated. When the ratio is less than 0.9, mixing of air bubbles or foaming tend to occur upon extrusion or molding, which presumably lowers an yield of the extruded or molded product. When it exceeds 10.0, on the other hand, toughness of the resulting composition presumably shows a marked deterioration.

The polyamide resin composition according to the present invention is characterized that it contains an apatite type compound and the polyamide and the apatite type compound bond and adhere considerably well at the interface thereof. For the synthesis of apatite type compounds, for example, hydroxyapatite, employed is wet synthesis in which calcium hydroxide, phosphoric acid and the like are reacted in an aqueous solution of about pH 8 or hydrothermal synthesis of calcium monohydrogenphosphate under high-temperature high-pressure conditions at 200° C. and 15 atmospheric pressure. These conditions for the synthesis of the apatite type compound are very close to those of the polyamide. The present inventors paid attentions this fact. Described specifically, the polyamide resin composition of the present invention is obtained by mixing the polyamide-forming component and apatite forming component and synthesizing the apatite type compound at some stage during the polymerization of the polyamide. In this manner, physical and chemical interactions such as ionic bonding, adsorption and graft reaction occur between the polyamide under a polymerization stage and the apatite type compound under a synthesis stage, whereby the polyamide-forming component (raw material) and polyamide component are incorporated inside and on the surface part of the apatite type compound particles. The apatite type compound synthesized through such reaction products (organic substances) can be uniformly and finely dispersed in the polyamide serving as a matrix. In the polyamide resin composition thus obtained, the polyamide and apatite type compound therefore have an interface bonded and adhered surprisingly well.

The polyamide which is a matrix of the polyamide resin composition of the present invention is eluted into a phenol solvent, while the above-described reaction products (organic substances) are not eluted into the phenol solvent. In other words, when the polyamide composition is eluted in a phenol solvent, followed by filtration, the above-described organic substances remain with the apatite type compound. In the present invention, the organic substances must remain in the apatite type compound in an amount of 1 to 100 parts, preferably 3 to 100 parts by weight, particularly preferably 4 to 50 parts by weight per 100 parts by weight of the apatite type compound. When the amount of the organic substances is less than 1 part by weight per 100 parts by weight of the apatite type compound, the toughness of the resulting molded product presumably lowers more. Amounts exceeding 100 parts by weight, on the other hand, presumably deteriorate the moldability.

The formation of the above-described organic substances result from physical and chemical interactions between the polyamide-forming component and/or polyamide and apatite and they do not elute in a phenol solvent. The organic substances are preferably composed at least partially of the polyamide, since if so, adhesion with the polyamide serving as a matrix is improved more. It does not matter if the organic substance contains water.

The existence of organic substances can be confirmed by subjecting the separated apatite type compound to pyrolysis gas chromatography, followed by mass spectrum (MS) of the pyrolytically decomposed components. It can also be confirmed by infrared absorption spectrum or nuclear magnetic resonance (NMR) of the separated apatite type compound. According to the investigation of the present inventors, the organic substances in the present invention originate from the polyamide-forming component or polyamide, or reaction product thereof based on the measurement results of infrared absorption spectrum, pyrolysis gas chromatography and mass spectrum (MS) of the pyrolytically decomposed components. Identification of the organic substances can be conducted by eluting the polyamide resin composition with a 90 wt. % aqueous phenol solution and then confirming the existence of components having the same characteristics as those of the pyrolytically decomposed component such as polyamide-forming component or polyamide. A description will next be made of the case where hexamethylenediamine adipate is used as the polyamide-forming component. In this case, if existence of cyclopentanone is confirmed in the pyrolytically decomposed component at 550° C. of the apatite type compound separated by elution of the resulting polyamide resin composition with a 90 wt. % aqueous phenol solution, it indicates that the organic substances contain adipic acid. If existence of adiponitrile is confirmed, it indicates that the organic substances contain hexamethylenediamine. If both of cyclopentanone and adiponitrile are confirmed simultaneously in the pyrolytically decomposed component, it indicates that the organic substances contain polyhexamethylene adipamide (nylon 66).

The amount of the organic substances of the present invention can be determined by (a) separation of the apatite type compound, (b) measurement of a heating loss ratio of the separated apatite type compound and (c) quantitative determination of the organic substance by measuring the pyrolytically decomposed component, which process will be described below specifically.

(a) Separation of the Apatite Type Compound:

10 g of a polyamide resin composition is weighed and it is mixed with 200 ml of 90 wt. % phenol, followed by stirring at 40° C. for 2 hours. The reaction mixture is separated using a centrifugal separator and the supernatant solvent is removed. To the residue is added 200 ml of phenol. Dissolving operation similar to the above and separating operation using the centrifugal separator are carried out 4 times in repetition. Then, addition of 200 ml of 99.5 wt. % of ethanol, stirring at 23° C. for 2 hours, separation by the centrifugal separator and removal of the supernatant solvent are successively carried out and this operation is repeated 4 times. The residue is dried in a vacuum dryer, whereby the apatite type compound is obtained.

(b) Measurement of a Heating Loss Ratio of the Separated Apatite Type Compound:

5 to 15 mg of the resulting apatite type compound is weighed. After heating from 30° C. to 550° C. at a heating rate of 99.9° C./min by a thermogravimetric analyzer (TGA), the compound is maintained at 550° C. for 1 hour. A heating loss ratio X can be calculated according to the below-described equation by using an initial weight ($W_0$) at 30° C. and a final weight ($W_1$) after the compound is maintained at 550° C. for 1 hour.

Heating loss ratio X (part by weight/100 parts by weight of the apatite type compound)=$(W_0-W_1) \times 100/W_1$ (c) Quantitative Determination of the Organic Substance by Measuring the Pyrolytically Decomposed Component:

1 to 10 mg of the apatite type compound obtained above in (a) is weighed and measurement is carried out under the conditions of a heat decomposition temperature of 550° C. and column temperature of 50 to 320° C. (heating rate at 20° C./min) by pyrolysis gas chromatography. The pyrogram of the resulting pyrolysis gas chromatography is divided into two parts, that is, retention time less than 2 minutes and retention time of 2 minutes or greater and their peak areas are calculated. Since the components having a retention time not greater than 2 minutes are low-molecular components such as carbon dioxide, the area of these low molecular components are subtracted from the whole area and the remaining area is designated as the amount of the organic substance. Described specifically, areas Sa (less than 2 minutes) and Sb (2 minutes or greater) are calculated respectively and the amount of the organic substance is calculated using the above-described heating loss ratio X of (b).

Amount of an organic substance (part by weight/100 parts by weight of the apatite type compound)=$X \cdot Sb/(Sa+Sb)$ The apatite type compound contained in the polyamide resin composition of the present invention preferably has an average particle size of 1 μm or less, more preferably 0.1 μm or less. In the present invention, for the determination of the average particle size, electron microphotography is employed and the average particle size is calculated as described below. An ultra thin piece cut out from the molded product is photographed under transmission electron microscope (TEM:×25000 magnification) and the particle size di and the number $n_i$ of the particles are measured, followed by calculation of the average particle size based on the following equation:

Average particle size=$\Sigma d_i \cdot n_i / \Sigma n_i$

In the case where the particle does not seem to have a spherical shape, the longer diameter and shorter diameter of it are measured and the half of the sum of these diameters is designated as the particle size. In addition, for the calculation of the average particle size, at least 2000 particles must be measured.

To the polyamide resin composition of the present invention, various additives ordinarily employed for polyamide resins can be added as needed within an extent not impairing the object of the present invention. Examples include fillers, e.g., inorganic fibers such as glass fibers and carbon fibers and inorganic fillers such as mica, talc, clay minerals, alumina and silica; flame retardants such as antimony trioxide, aluminum hydroxide, magnesium hydroxide, zinc borate, zinc stannate, zinc hydroxystannate, ammonium polyphosphate, melamine cyanurate, succinoguanamine, melamine polyphosphate, melamine sulfate, melamine phthalate, aromatic polyphosphates and complex glass powders; pigments or colorants such as titanium white; thermal stabilizers such as sodium phosphite and hindered phenol; lubricants such as stearic acid and paraffin wax; various plasticizers; weather resistance improvers and antistatic agents.

Moreover, thermoplastic resins or elastomers ordinarily mixed with a polyamide resin can be incorporated as needed within an extent not damaging the object of the present invention. Examples of such thermoplastic resins or elastomers include polybutadiene, butadiene-styrene copolymer, acrylic rubber, ethylene-propylene copolymer, ethylene-propylene-diene copolymer, natural rubber, modified products thereof with an acid such as maleic anhydride, styrene-maleic anhydride copolymer, styrene-phenylmaleimide copolymer, polyethylene, polypropylene, butadiene-acrylonitrile copolymer, polyester resins such as polyethylene terephthalate and polybutylene terephthalate, polyamide resins other than the above-described ones, aromatic polyester resins, polyphenylene ether resins, polyphenylene sulfide resins, phenol resins and epoxy resins.

The present invention will be described more specifically with reference to the following Examples. It should however be borne in mind that the present invention is not limited to or by the following Examples so long as they do not depart from the spirit or scope of the present invention. Physical properties described in the Examples and Comparative Examples below were evaluated as follows:

1. CHARACTERISTICS OF THE POLYAMIDE-FORMING COMPONENT AND APATITE TYPE COMPOUND-FORMING COMPONENT (1-1) Content (wt. %) of the Apatite Type Compound-forming Component It was calculated from the amounts of the polyamide-forming component and apatite type compound-forming component added.

(1-2) Molar Ratio of the Metal Element to Phosphorus in the Apatite Type Compound-forming Component A molar ratio of the metal element to phosphorus was calculated from the amount of the apatite type compound-forming component added and molecular weight thereof.

2. CHARACTERISTICS OF THE POLYAMIDE RESIN COMPOSITION (2-1) Weight-average Molecular Weight (Mw) of the Polyamide It was determined by gel permeation chromatography (GPC). As an apparatus, detector, solvent and column, "HLC-8020" manufactured by TOSOH CORPORATION, a differential refractometer (RI), hexafluoroisopropanol (HFIP) and two TSKgel-GMHHR-Hs and one G1000HHR manufactured by TOSOH CORPORATION were employed, respectively. At a flow rate of the solvent of 0.6 ml/min and sample concentration of 1 to 3 (mg of sample)/l (ml of solvent), the polyamide was filtered to remove the insoluble matter, whereby a measurement sample was obtained. Based on the elution curve, the weight average molecular weight (Mw) was calculated in terms of polymethyl methacrylate (PMMA).

(2-2) Determination of the Content of the Apatite Type Compound (wt. %)

A polyamide resin composition was dried at 100±20° C. for 8 hours, followed by cooling. 1 g of the composition was weighed on a platinum boat and incinerated in an electric oven of 650±20° C. After cooling, the residue was weighed as the content of the apatite type compound.

(2-3) Molar Ratio of the Metal Element to Phosphorus (a) Quantitative Determination of the Metal Element:

Determination of the metal element will next be described using calcium as an example, which can also be applied to the determination of another metal element.

0.5 g of the polyamide resin composition was weighed on a platinum boat and incinerated in an electric oven of 500° C. After cooling, 5 ml of hydrochloric acid and 5 ml of pure water were added to the residue and the latter was dissolved in the former two by boiling on a heater. The resulting solution was cooled again and then added with pure water to make it 500 ml. Determination was conducted at a wavelength of 317.933 nm by using "IRIS/IP" manufactured by Thermo JarrellAsh in accordance with inductively coupled plasma (ICP) emission spectrometry.

(b) Determination of Phosphorus:

0.5 g of the polyamide resin composition was weighed. To it, 20 ml of concentrated sulfuric acid was added, followed by wet decomposition on a heater. After cooling, 5 ml of hydrogen peroxide was added and the resulting mxiture was heated on the heater to concentrate the whole amount to 2 to 3 ml. The concentrate was cooled and added with pure water to make it 500 ml. Determination was conducted at a wavelength of 213.618 (nm) in accordance with inductively coupled plasma (ICP) emission spectrometry by using "IRIS/IP" manufactured by Thermo Jarrell Ash.

(2-4) Amount of the Organic Substance (a) Separation of the Apatite Type Compound:

10 g of the polyamide resin composition was weighed and mixed with 200 ml of 90 wt. % phenol. The resulting mxiture was stirred at 40° C. for 2 hours. Using a centrifugal separator ("H103RLH" manufactured by Kokusan Enshin-bunriki K.K.), the reaction mixture was centrifuged at 20000 rpm for 1 hour and the supernatant solvent was removed. To the residue was added 200 ml of phenol. Then, the similar dissolving operation and separating operation using a centrifugal separator were repeated 4 times. The residue was added with 200 ml of 99.5 wt. % of ethanol, followed by stirring at 23° C. for 2 hours, centrifugal separation at 20000 rpm for 1 hour by using a centrifugal separator and removal of the supernatant solvent. These operations were repeated further 4 times. The residue was dried in a vacuum drier at 80° C. for 12 hours, whereby the target apatite type compound was obtained.

(b) Measurement of a Heating Loss Ratio of the Separated Apatite Type Compound:

10 mg of the apatite type compound obtained in (a) of (2-4) was weighed and a heating loss ratio X was determined by thermogravimetric analyzer (TGA). Using "TGA-50" manufactured by Shimadzu Corporation as an apparatus, the compound was heated from 30° C. to 550° C. at a heating rate of 99.9° C./min and then maintained at 550° C. for 1 hour. From the initial weight ($W_0$) at 30° C. and the final weight ($W_1$) after maintained at 550° C. for 1 hour, a heating loss ratio was calculated in accordance with the following formula:

> Heating loss ratio X (part by weight/100 parts by weight of the apatite type compound)=($W_0$-$W_1$)×100/$W_1$ (c) Quantitative Determination of the Organic Substance:

3 g of the apatite type compound obtained in (a) of (2-4) was weighed and subjected to pyrolysis gas chromatography (GC) and MS under the below-described conditions, whereby a pyrogram was obtained.

Pyrolysis

Apparatus: "Double shot pyrolyser PY-2010D" manufactured by Frontier Inc.

Thermal decomposition temperature: 550° C.

Gas chromatography (GC)

Apparatus: "HP-5890" manufactured by HEWLETT PACKARD

Column: "DURABOND DB-1" manufactured by J&W Inc. (0.25 mm I.D.×30 m, film thickness: 0.25 μm)

Column temperature: 50° C.→320° C. (heating rate: 20° C./min)

Inlet temperature: 320° C.

Detector temperature: 320° C.

Mass spectrum (MS)

Apparatus: "Auto MS System II" manufactured by JEOL Ltd.

Ionization: EI (70V)

Mass measurement range: m/z=10 to 400

Temperature: 200° C.

The pyrogram of pyrolysis GC thus obtained was divided into regions of retention time less than 2 minutes and retention time of 2 minutes or greater and their peak areas Sa (less than 2 minutes) and Sb (2 minutes and greater) were calculated. Using the heating loss ratio X determined in (b) of (2-4), the amount of the organic substance was calculated in accordance with the following equation:

> The amount of the organic substance (part by weight/100 parts by weight of the apatite type compound)=X·Sb/(Sa+Sb)

In addition, pyrolytically decomposed component was identified based on mass spectrum (MS).

(2-5) Infrared Absorption Spectrum

Infrared absorption spectrum of the apatite compound obtained in (a) of (2-4) was measured. By using an apparatus "1640" manufactured by Perkin Elmer, measurement was conducted at a resolving power of 4 $cm^{-1}$.

(2-6) Confirmation of Formation of the Apatite Type Compound According to X-ray Diffraction X-ray diffraction of the apatite type compound obtained in (a) of (2-4) was measured under the following conditions.

X rays: copper Kα

Wave-number: 1.542 Å

Voltage of tube: 40 KV

Current of tube: 200 mA

Scanning rate: 4 deg./min

Divergence slit: 1 deg.

Scattering slit: 1 deg.

Light-intercepting slit: 0.15 mm

3. PHYSICAL PROPERTIES OF THE POLYAMIDE RESIN COMPOSITION (3-1) Flexural Modulus and Flexural Strength (Kg/$cm^2$)

They were measured in accordance with ASTM D790.

(3-2) Tensile Strength (Kg/$cm^2$) and Tensile Elongation (%)

They were measured in accordance with ASTM D638.

(3-3) Notched Izod Impact Strength (Kg·cm/cm)

It was measured in accordance with ASTM D256.

(3-4) Deflection Temperature Under Load (0° C.)

It was measured in accordance with ASTM D648 under a load of 18.6 Kg/$cm^2$.

(3-5) Water Absorption (%)

It was measured in accordance with ASTM D570 as a weight change after maintained in water of 23° C. for 24 hours.

(3-6) Water Absorption Characteristics

Flexural modulus of the molded product was measured after maintaining it in water of 80° C. for 8 hours and water of 23° C. for 16 hours and then maintaining at 23° C. and 50% humidity for 4 weeks.

(3-7) Compressive Creep (mm)

It was measured in accordance with ASTM as a distortion amount of an injection molded product, which had a thickness of 3 mm and a side of 10 mm, after the product was maintained under conditions of 120° C. and 500 Kg/$cm^2$ for 100 hours.

(3-8) Warpage Characteristics (mm)

A flat plate obtained by injection molding using a mold having a thickness of 3 mm and a side of 130 mm was placed on a horizontal plane and the maximum gap distance from the horizontal plane was measured.

(3-9) Dimensional Characteristics (%)

The size of a flat plate obtained by injection molding using a mold having a thickness of 3 mm and a side of 130 mm was measured and a shrinkage factor was determined.

EXAMPLE 1

As a polyamide-forming component, an aqueous solution obtained by dissolving 1.5 Kg of an equimolar solid salt of hexamethylenediamine adipate in 1.5 Kg of pure water of 50° C. was used. As an apatite type compound-forming component, 600 g (calcium monohydrogenphosphate dihydrate pure water=150 g: 450 g) of a 25 wt. % suspension of calcium monohydrogenphosphate dihydrate (CaHPO$_4$.2H$_2$O) having an average particle size of 10 μm and 232 g (calcium carbonate: pure water=58 g: 174 g) of a 25 wt. % suspension of ground calcium carbonate (CaCO$_3$) having an average particle size of 1.5 μm were used. These aqueous solution and suspensions were charged in a 5-liter autoclave as the polyamide-forming component and the apatite type compound-forming component, respectively, followed by stirring thoroughly at 50° C. From the amounts of the components employed, the content of the apatite type compound-forming component and a molar ratio of the metal element to phosphorus were calculated to be 12.2 wt. % and 1.67, respectively. After purging sufficiently with nitrogen, the autoclave was heated from 50° C. to 270° C. The pressure in the autoclave at that time was 18 Kg/cm² as a gauge pressure. Heating was continued for 1 hour while taking water out of the system to prevent the pressure from exceeding 18 Kg/cm². Heating was then stopped and the autoclave was allowed to cool down to room temperature. The autoclave was then opened. From the autoclave, about 1.5 Kg of the resulting polymer was taken out, pulverized in a pulverizer and then dried for 24 hours in a nitrogen gas stream of 80° C. A molded product was obtained by injection molding of the dried polymer particles thus obtained. The weight-average molecular weight (Mw) determined from the resulting polymer particles was 36000 and as a result of measurement by incineration, the content of the apatite type compound was found to be 10.2 wt. %. In addition, as a result of quantitative determination of calcium and phosphorus by inductively coupled plasma emission spectrometry, a molar ratio of calcium to phosphorus was calculated to be 1.67. Observation of the molded product under a transmission microscope showed that the apatite type compound had an average particle size of 0.32 μm. In FIG. 1, measurement results of wide-angle X-ray diffraction of the apatite type compound obtained by eluting and separating operations of the polyamide resin composition using a 90 wt. % aqueous phenol solution are shown. As is apparent from the drawing, the formation of the crystalline apatite type compound can be confirmed. Concerning the apatite type compound obtained by the eluting and separating operations, the heating loss ratio X as measured by thermogravimetry was 6.38 (parts by weight/100 parts by weight of the apatite type compound); Sb/(Sa+Sb) as measured by pyrolysis gas chromatography was 0.80; and the amount of the organic substances was 5.1 (parts by weight/100 parts by weight of the apatite type compound). In addition, from the results of pyrolysis GC and mass spectrum, existence of cyclopentanone was confirmed as one pyrolytically decomposed component of the organic substance remaining in the apatite type compound. Moreover, from the observation of infrared absorption spectrum, a peak indicating the existence of the organic substance at 1548 cm⁻¹ which could not be observed from the composition obtained in Comparative Example 1 was confirmed. At the same time, peaks suggesting the incorporation of carbonic acid were confirmed at 1416 cm⁻¹ and 1455 cm⁻¹ in this infrared absorption spectrum. The measurement results of the physical properties of the molded product obtained in this example are shown in Table 1.

COMPARATIVE EXAMPLE 1

Figure 3:
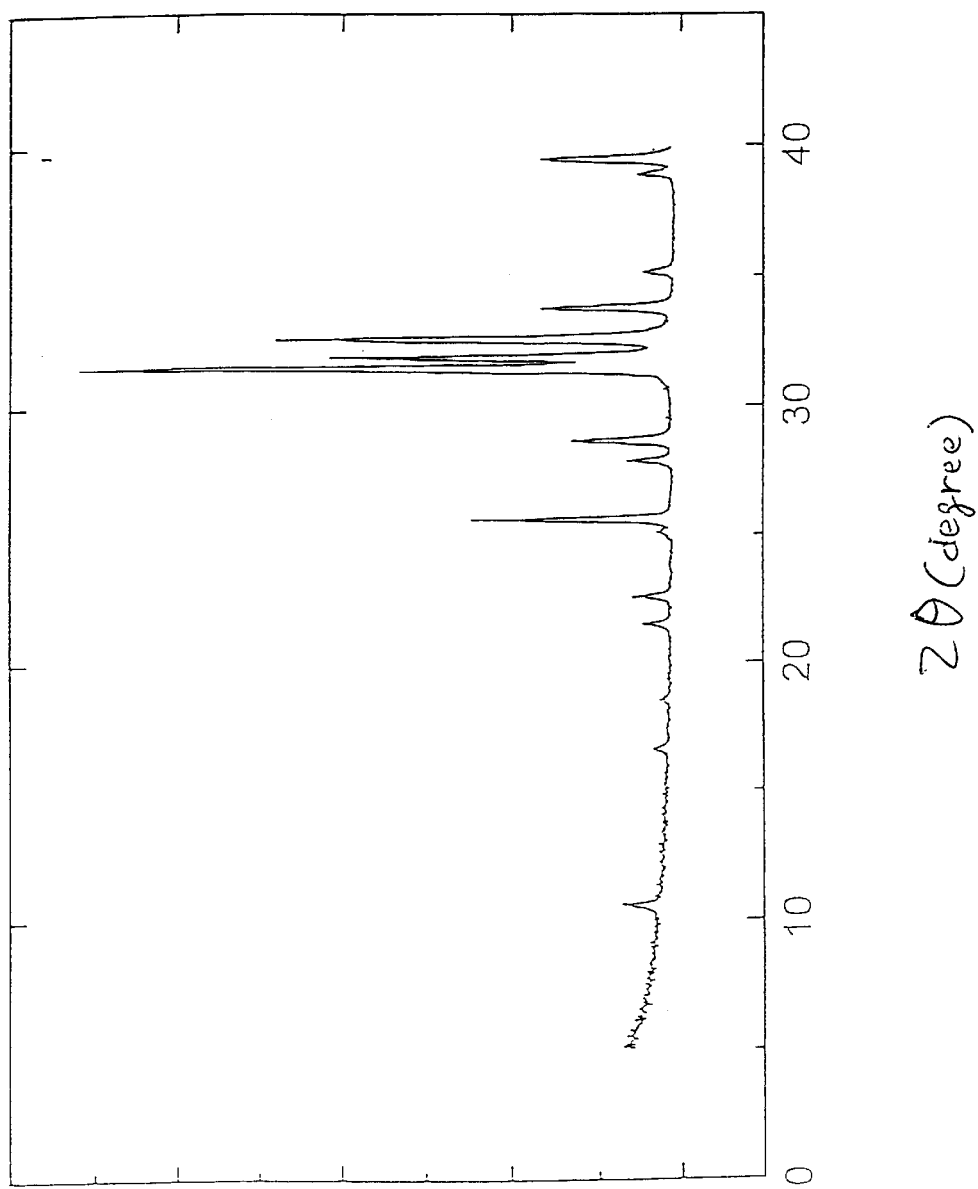
FIG. 3 illustrates the measurement results of wide-angle X-ray diffraction of the apatite type compound separated from the composition of Comparative Example 1.
Figure 4:
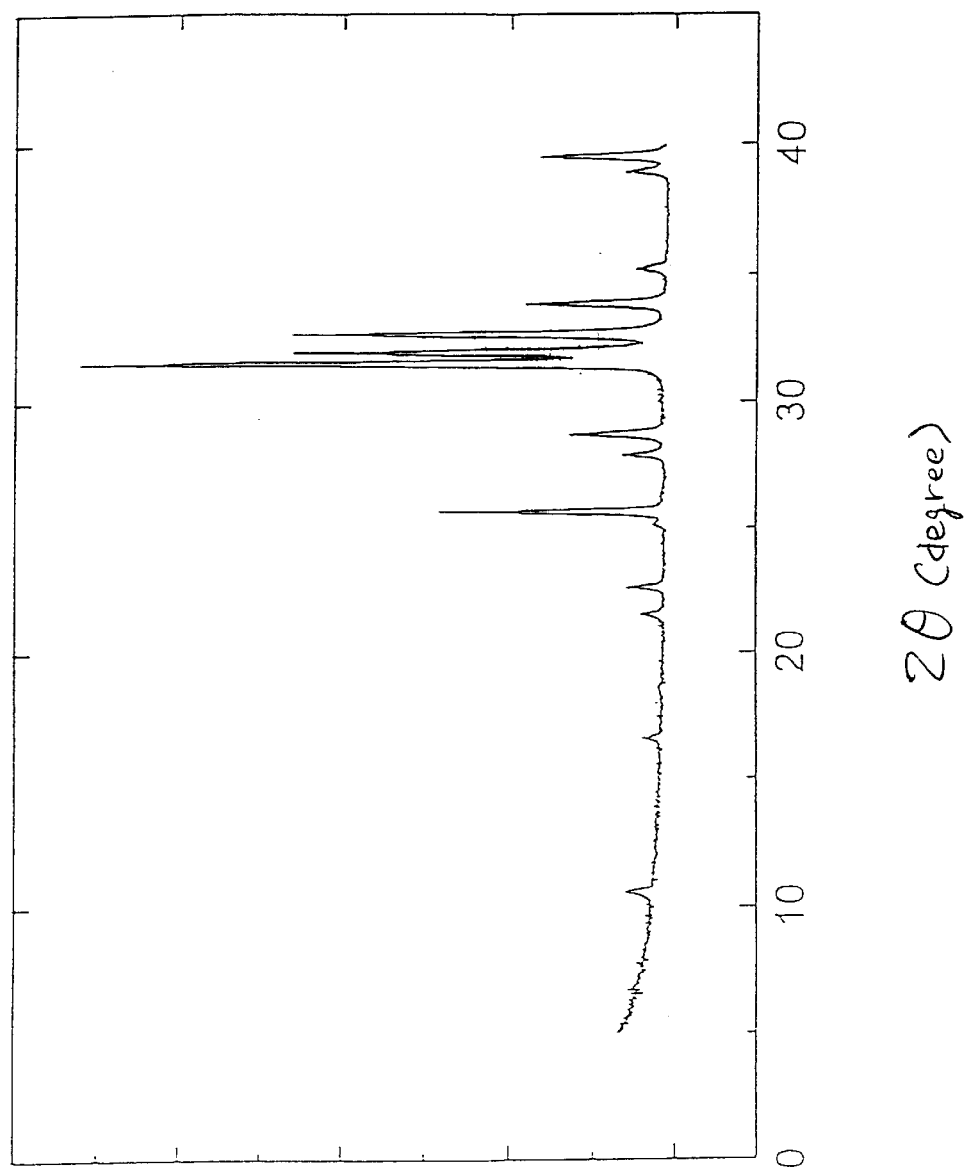
FIG. 4 illustrates the measurement results of wide-angle X-ray diffraction of commercially available hydroxyapatite employed in Reference Example 1.

Mixed were 9 Kg of "Leona 1300" (nylon 66) produced by of Asahi Chemical Industry Co., Ltd. and 1 Kg of hydroxyapatite produced by Taihei Chemical Industrial Co., Ltd. and having an average particle size of 25 μm. The resulting mxiture was kneaded under molten state at 280° C. in a twin-screw extruder ("TEM 35" manufactured by Toshiba Machine Co., Ltd.). The kneaded mass taken out from a nozzle in a strand form was cooled with water and cut, whereby a polyamide resin composition was obtained. It was found to have a weight-average molecular weight of 36000. Measurement by incineration showed that the content of the apatite type compound was 10.1 wt. %. As a result of calculation based on the amounts of phosphorus and calcium determined by inductively coupled plasma emission spectrometry, a molar ratio of calcium to phosphorus was found to be 1.66. Observation of the formed product under a transmission microscope showed that the average particle size of the apatite type compound was 3.2 μm. In FIG. 3, results of wide-angle X-ray diffraction of the apatite type compound obtained by eluting and separating operations of the polyamide resin composition by using 90 wt. % phenol are shown. Concerning the resulting apatite type compound, the heating loss ratio X as measured by thermogravimetry was 2.50 (parts by weight/100 parts by weight of the apatite type compound); Sb/(Sa+Sb) as measured by pyrolysis GC and MS was 0.06; and the amount of the organic substance was 0.15 (part by weight/100 parts by weight of the apatite type compound). From the analysis results of pyrolysis GC and mass spectrum, it was found that no pyrolytically decomposed components of the organic substance existing in the apatite type compound coincided with those of the polyamide-forming component (hexamethylenediamine and adipic acid) or polyhexamethylene adipamide. Moreover, infrared absorption spectrum was substantially similar to that of hydroxyapatite compound (produced by of Taihei Chemical Industrial Co., Ltd.) used as an apatite compound in this example and a peak indicating the existence of the organic substance was not confirmed. The measurement results of the physical properties of the molded product are shown in Table 1.

REFERENCE EXAMPLE 1

Hydroxyapatite (produced by Taihei Chemical Industrial Co., Ltd., a molar ratio of calcium to phosphorus: 1.67) used in Comparative Example 1 was dried at 80° C. under reduced pressure, followed by thermogravimetry. As a result, a heating loss ratio X was found to be 2.23 (parts by weight/100 parts by weight of the apatite type compound). From the pyrogram of pyrolysis GC at a retention time of 2 minutes or greater, no peak was detected, Sb/(Sa+Sb) was 0.0 and the amount of the organic substance was 0.0 (part by weight/100 parts by weight).

EXAMPLE 2

In a similar manner to Example 1 except for the use of, as the polyamide-forming component, an aqueous solution obtained by dissolving 1.2 Kg of an equimolar solid salt of hexamethylenediamine adipate and 0.3 Kg of an equimolar solid salt of hexamethylenediamine isophthalate in 1.5 Kg of pure water, a molded product of the polyamide resin composition was obtained. The measurement results of the physical properties of the resulting molded product are shown in Table 1.

EXAMPLE 3

In a similar manner to Example 1 except for the use of, as the polyamide resin component, an aqueous solution obtained by dissolving 1.5 Kg of an equimolar solid salt of hexamethylenediamine dodecanoate in an amount of 1.5 Kg of pure water, a molded product of the polyamide resin composition was obtained. The measurement results of the physical properties of the resulting molded product are shown in Table 1.

EXAMPLE 4

In a similar manner to Example 1 except for the use of, as the polyamide-forming component, an aqueous solution obtained by dissolving 1.2 Kg of an equimolar solid salt of hexamethylenediamine adipate and 0.3 Kg of ε-caprolactam in 1.5 Kg of pure water, a molded product of the polyamide resin composition was obtained. The measurement results of the physical properties of the resulting molded product are shown in Table 1.

EXAMPLE 5

As a polyamide-forming component, an aqueous solution obtained by dissolving 2.0 Kg of ε-caprolactam in 1.0 Kg of pure water was used. As an apatite type compound-forming component, 600 g (calcium monohydrogenphosphate dihydrate pure water=150 g: 450 g) of a 25 wt. % suspension of calcium monohydrogenphosphate dihydrate having an average particle size of 10 μm and 232 g (calcium carbonate: pure water=58 g: 174 g) of a 25 wt. % suspension of ground calcium carbonate having an average particle size of 1.5 μm were used. These polyamide-forming component and apatite type compound-forming component were charged in a 5-liter autoclave, followed by stirring thoroughly at 80° C. Then, the temperature was elevated to 260° C. and stirring was conducted for 1 hour under pressure of 15 Kg/cm². Then, the pressure was released and reaction was effected at 260° C. for 2 hours under normal pressure, while water was taken out from the autoclave. Reaction was further effected for 1 hour under reduced pressure of 400 mmHg. After completion of the reaction, the product was taken out from the bottom nozzle in a form of strand, cooled with water and then cut into pellets. The resulting pellets were dried for 24 hours in a nitrogen gas stream of 80° C. The measurement results of the physical properties of the thus formed product are shown in Table 1.

EXAMPLE 6

Figure 2:
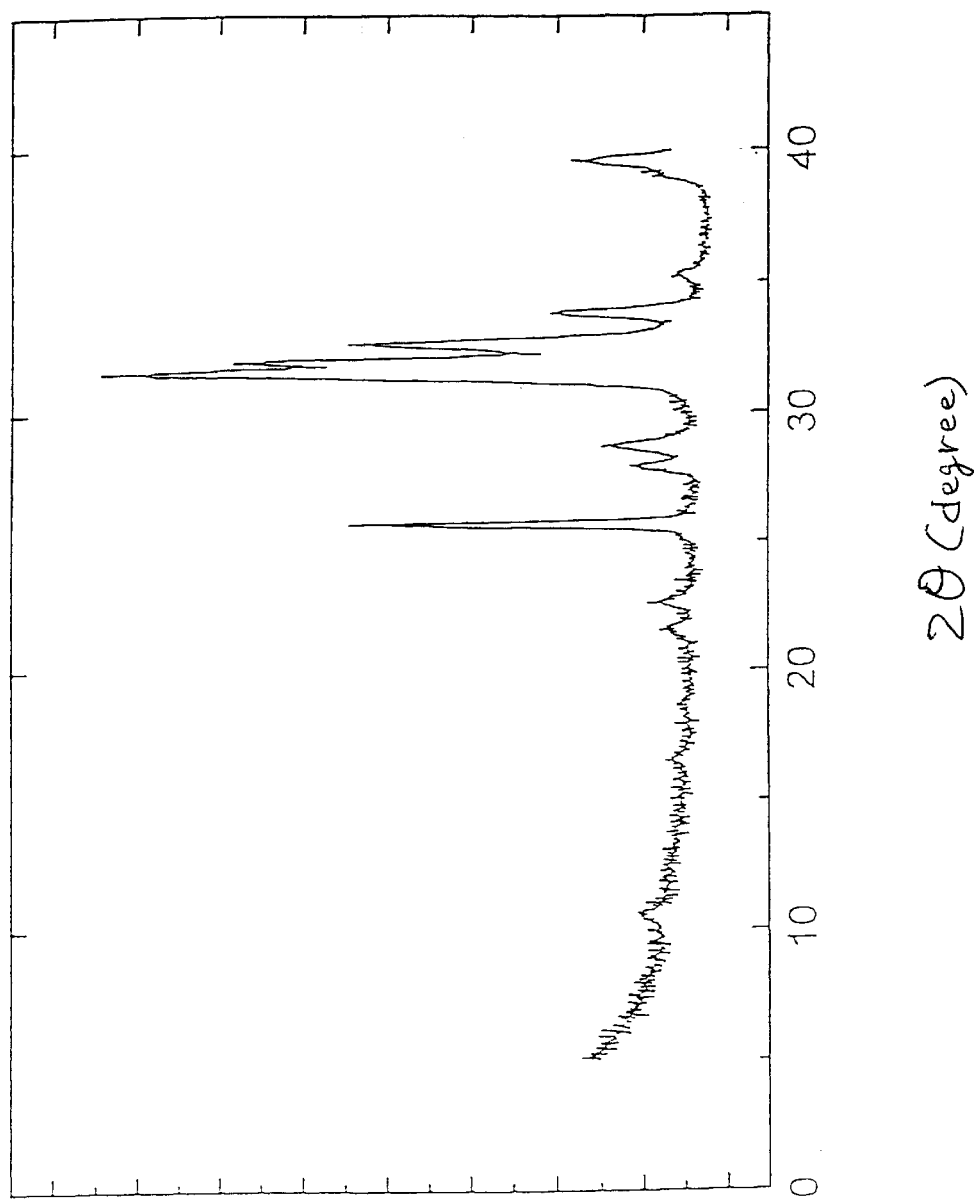
FIG. 2 illustrates the measurement results of wide-angle X-ray diffraction of the apatite type compound separated from the composition of Example 6.

As a polyamide-forming component, 3.0 Kg of an equimolar solid salt of hexamethylenediamine adipate was used. As an apatite type compound-forming component, 200 g of calcium monohydrogenphosphate dihydrate having an average particle size of 10 μm was used. These polyamide-forming component and apatite type compound-forming component were stirred thoroughly in a Henschel mixer, followed by charging in a 5-liter autoclave. The content of the apatite type compound-forming component and a molar ratio of the metal element to phosphorus were calculated to be 6.3 (wt. %) and 1.00, respectively. After the autoclave was purged sufficiently with nitrogen, the pressure was set at 5 Kg/cm² as a gauge pressure and the temperature was elevated from room temperature to 190° C. Those conditions were maintained for 2 hours. The pressure in the autoclave at that time was 15 Kg/cm² as a gauge pressure. The pressure was then reduced to 0.5 Kg/cm² and the temperature was elevated to 240° C. Those conditions were maintained for 8 hours. In a series of the above-described operations, resulting water was removed from a partial condenser in order to keep pressure at 0.5 Kg/cm². After cooling, the autoclave was opened and the polymer taken out from the autoclave was pulverized. The pulverized polymer was dried for 24 hours in a nitrogen gas stream of 80° C. The resulting polymer particles were pelletized using a small-sized twin-screw extruder ("Laboplast mill Model ME" manufactured by Toyo Seiki Seisaku-sho, Ltd.) under the conditions of a cylinder temperature of 280° C., rotational number of screw of 70 rpm and extrusion rate of 4 Kg/hr. The pellets were dried for 24 hours in a nitrogen gas stream of 80° C. The weight-average molecular weight of the pellets was 210000 and as a result of measurement by incineration, the content of the apatite type compound was found to be 5.2 wt. %. In addition, as a result of quantitative determination of calcium and phosphorus by inductively coupled plasma emission spectrometry, a molar ratio of calcium to phosphorus was calculated to be 1.01. Observation under a transmission type microscope of the pellet show that the apatite type compound had an average particle size of 0.25 μm. In FIG. 2, results of X-ray diffraction of the apatite type compound obtained by eluting and separating operations of the polyamide resin composition by using a 90 wt. % aqueous phenol solution are shown. As is apparent from the drawing, the formation of apatite type compound can be confirmed. The heating loss ratio X as measured by thermogravimetry was 5.67 (parts by weight/100 parts by weight of the apatite type compound); Sb/(Sa+Sb) as measured by pyrolysis gas chromatography was 0.72; and the amount of the organic substance was 4.1 (parts by weight/100 parts by weight of the apatite type compound). In addition, from the analysis results of pyrolysis GC and mass spectrum, existence of adiponitrile was confirmed as one pyrolytically decomposed component of the apatite type compound. Moreover, from the observation of infrared absorption spectrum, a peak indicating the existence of the organic substance at 1650 cm$^{-1}$ was confirmed. The measurement results of the physical properties of thus formed product are shown in Table 2.

EXAMPLE 7

In a similar manner to Example 6 except for the use of, as the apatite type compound-forming component, 100 g of calcium monohydrogenphosphate dihydrate having an average particle size of 10 μm, pellets were obtained. The resulting pellets were found to have a weight-average molecular weight of 520000. From the measurement results by incineration, the content of the apatite type compound was found to be 2.5 wt. %. The measurement results of the physical properties of thus formed product are shown in Table 2.

COMPARATIVE EXAMPLE 2

In a similar manner to Example 6 except for the use of, as the apatite type compound-forming component, 10.5 g of calcium monohydrogenphosphate dihydrate having an average particle size of 10 μm, pellets were obtained. As a result of calculation, the content of the apatite type compound-forming component was 0.35 wt. % and a molar ratio of calcium to phosphorus was 1.00. The resulting pellets were found to have a weight-average molecular weight of 70000. The measurement results by incineration showed that the content of the apatite type compound was 0.21 wt. %. Based on the results of the quantitative determination of calcium and phosphorus by inductively coupled plasma emission spectrometry, a molar ratio of calcium to phosphorus was calculated to be 0.95. The measurement results of the physical properties of the thus-formed product are shown in Table 2.

REFERENCE EXAMPLE 2

In a similar manner to Example 1 except that only 3 Kg of an aqueous solution obtained by dissolving 1.5 Kg of an equimolar solid salt of hexamethylenediamine adipate in 1.5 Kg of pure water, that is, only a polyamide-forming component was charged in a 5-liter autoclave, the pellets were obtained. The resulting pellets were found to have a weight-average molecular weight of 35000. The measurement results of the physical properties of the thus-formed product are shown in Table 2.

EXAMPLE 8

As a polyamide-forming component, an aqueous solution obtained by dissolving 1.5 Kg of an equimolar solid salt of hexamethylenediamine adipate in 1.5 Kg of pure water of 50° C. was used. As an apatite type compound-forming component, 600 g (calcium monohydrogenphosphate dihydrate pure water=150 g: 450 g) of a 25 wt. % suspension of calcium monohydrogenphosphate dihydrate having an average particle size of 10 μm and 232 g (calcium carbonate: pure water=58 g: 174 g) of a 25 wt. % suspension of ground calcium carbonate having an average particle size of 1.5 μm were used. These polyamide-forming component and apatite type compound-forming component were charged in a 5-liter autoclave, followed by addition of 4.5 g of acetic acid ($CH_3COOH$) as a molecular weight control agent. The resulting mixture was stirred thoroughly at 50° C. After sufficiently purged with nitrogen, the autoclave was heated from 50° C. to 270° C. At that time, the pressure in the autoclave became 18 Kg/cm² as a gage pressure. Heating was continued for 1 hour while taking out water from the system to prevent the pressure from exceeding 18 Kg/cm². Heating was then stopped. After cooling to room temperature, the autoclave was opened. About 1.5 Kg of the resulting polymer was taken out from the autoclave, followed by pulverization in a pulverizer. The resulting polymer was found to have a weight-average molecular weight of 12500. The polymer was charged in a 10-liter tumbler-type reactor and maintained at 200° C. for 8 hours while 5 liter/min of nitrogen was circulated continuously. After cooling, the polymer was taken out from the reactor and injection molded. The resulting polymer was found to have a weight-average molecular weight of 42000. The measurement results of the physical properties of the molded product thus obtained are shown in Table 3.

EXAMPLE 9

As a polyamide-forming component, an aqueous solution obtained by dissolving 1.5 Kg of an equimolar solid salt of hexamethylenediamine adipate in 1.5 Kg of pure water of 50° C. was used. As an apatite type compound-forming component, 600 g (calcium monohydrogenphosphate dihydrate pure water=150 g: 450 g) of a 25 wt. % suspension of calcium monohydrogenphosphate dihydrate having an average particle size of 10 μm and 232 g of a 25 wt. % suspension of ground calcium carbonate (calcium carbonate: pure water=58 g: 174 g) having an average particle size of 1.5 μm were used. These polyamide-forming component and apatite type compound-forming component were charged in a 5-liter autoclave, followed by the addition of 9.7 g of adipic acid ($COOH(CH_2)_4COOH$) as a molecular weight control agent. The resulting mixture was stirred thoroughly at 50° C. After sufficiently purged with nitrogen, the autoclave was heated from 50° C. to 270° C. At that time, the pressure in the autoclave became 18 Kg/cm² as a gage pressure. Heating was continued for 1 hour while taking out water from the system to prevent the pressure from exceeding 18 Kg/cm². Heating was then stopped. After cooling to room temperature, the autoclave was opened. About 1.5 Kg of the resulting polymer was taken out from the autoclave, followed by pulverization in a pulverizer. The resulting polymer was found to have a weight-average molecular weight of 14500. The polymer was extruded from a kneader type reactor ("PLABOR-BT-30-S2-60-L (L/D=60), produced by Plastic Engineering Laboratory) at a discharge rate of 4 Kg/hr at 290° C. The resulting polymer was found to have a weight-average molecular weight of 37000. The measurement results of the physical properties of the thus formed product are shown in Table 3.

EXAMPLE 10

In a similar manner to Example 8 except for the use of 20 g of stearylamine ($CH_3(CH_2)_{16}CH_2NH_2$) instead of acetic acid as the molecular weight control agent, an injection molded product was obtained. The measurement results of the physical properties of the product thus obtained are shown in Table 3.

EXAMPLE 11

In a similar manner to Example 9 except for the use of 14 g of aniline ($C_6H_5NH_2$) instead of acetic acid as the molecular weight control agent, an extruded product was obtained. The measurement results of the physical properties of the thus formed product are shown in Table 3.

EXAMPLE 12

In a similar manner to Example 8 except for the use of 20 g acetic acid as a molecular weight control agent, an injection molded product was obtained. The polymer thus obtained was found to have a weight-average molecular weight (Mw) of 18000. The measurement results of the physical properties of the molded product are shown in Table 3.

EXAMPLE 13

As a polyamide-forming component, an aqueous solution obtained by dissolving 1.0 Kg of an equimolar solid salt of hexamethylenediamine adipate in 1.0 Kg of pure water of 50° C. was used. As an apatite type compound-forming component, 1.0 Kg (calcium monohydrogenphosphate dihydrate: pure water=250 g: 750 g) of a 25 wt. % suspension of calcium monohydrogenphosphate dihydrate having an average particle size of 10 μm and 387 g (calcium carbonate: pure water=97 g: 290 g) of a 25 wt. % suspension of ground calcium carbonate having an average particle size of 1.5 μm were used. These polyamide-forming component and apatite type compound-forming component were charged in a 5-liter autoclave, followed by stirring thoroughly at 50° C. As a result of calculation, the content of the apatite type compound-forming component was 25.8 wt. % and a molar ratio of a metal element to phosphorus was 1.67. After sufficiently purged with nitrogen, the autoclave was heated from 50° C. to 270° C. At that time, the pressure in the autoclave became 18 Kg/cm² as a gage pressure. Heating was continued for 1 hour while water was taken out from the system to prevent the pressure from exceeding 18 Kg/cm². Heating was then stopped. After cooling to room temperature, the autoclave was opened. About 1.5 Kg of the resulting polymer was taken out from the autoclave, followed by pulverization in a pulverizer. The pulverized polymer was dried for 24 hours in a nitrogen gas stream of 80° C. The dried and pulverized polymer was pelletized using a twin-screw extruder ("TEM35", manufactured by Toshiba Machine Co., Ltd.) at 280° C. The pellets thus obtained was molded by an injection molder. The resulting polymer was found to have a weight-average molecular weight of 35000. The measurement results by incineration showed that the content of the apatite the compound was 22.3 wt. %. Based on the results of the quantitative determination of calcium and phosphorus by inductively coupled plasma emission spectrometry, a molar ratio of calcium to phosphorus was calculated to be 1.67. The measurement results of the physical properties of the thus molded product are shown in Table 4.

EXAMPLE 14

As a polyamide-forming component, an aqueous solution obtained by dissolving 750 Kg of an equimolar solid salt of hexamethylenediamine adipate in 750 g of pure water of 50° C. was used. As an apatite type compound-forming component, 1.5 Kg (calcium monohydrogenphosphate dihydrate: pure water=375 g: 1125 g) of a 25 wt. % suspension of calcium monohydrogenphosphate dihydrate having an average particle size of 10 $\mu$m and 580 g (calcium carbonate: pure water=145 g: 435 g) of a 25 wt. % suspension of ground calcium carbonate having an average particle size of 1.5 $\mu$m were used. These polyamide-forming component and apatite type compound-forming component were charged in a 5-liter autoclave, followed by stirring thoroughly at 50° C. As a result of calculation, the content of the apatite type compound-forming component was 40.9 wt. %. The operations thereafter were carried out in a similar manner to Example 13. The polymer thus obtained was found to have a weight-average molecular weight of 32000. The measurement results by incineration showed that the content of the apatite type compound was 39.1 (wt. %). The measurement results of the physical properties of the resulting molded product are shown in Table 4.

COMPARATIVE EXAMPLE 3

As a polyamide-forming component, an aqueous solution obtained by dissolving 400 g of an equimolar solid salt of hexamethylenediamine adipate in 400 g of pure water of 50° C. was used. As an apatite type compound-forming component, 2.0 Kg (calcium monohydrogenphosphate dihydrate pure water=500 g: 1500 g) of a 25 wt. % suspension of calcium monohydrogenphosphate dihydrate having an average particle size of 3.0 $\mu$m and 772 g (calcium carbonate pure water=193 g: 435 g) of a 25 wt. % suspension of ground calcium carbonate having an average particle size of 1.5 $\mu$m were used. These polyamide-forming component and apatite type compound-forming component were charged in a 5-liter autoclave, followed by stirring thoroughly at 50° C. As a result of calculation, the content of the apatite type compound-forming component was 63.4 wt. %. The operations thereafter were carried out in a similar manner to Example 13. The polymer taken out from the autoclave, pulverized and then dried was found to have a weight-average molecular weight of 14000. The measurement results by incineration showed that the content of the apatite type compound was 61.2 wt. %. The pelletization of the polymer was tried using a twin-screw extruder, resulting in failure because the strand upon extrusion was markedly unstable. It was also impossible to obtain the molded product.

EXAMPLE 15

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 10 $\mu$m and 104 g (calcium carbonate: pure water=26 g: 78 g) of a 25 wt. % suspension of ground calcium carbonate having an average particle size of 1.5 $\mu$m, an injection molded product was obtained. As a result of calculation, the content of the apatite type compound-forming component was 10.4 wt. % and a molar ratio of a metal element to phosphorus was 1.30. The polymer thus obtained was found to have a weight-average molecular weight of 38000. The measurement results by incineration showed that the content of the apatite the compound was 9.2 wt. %. Based on the results of the quantitative determination of calcium and phosphorus by inductively coupled plasma emission spectrometry, a molar ratio of calcium to phosphorus was calculated to be 1.28. The measurement results of the physical properties of the molded product thus obtained are shown in Table 5.

EXAMPLE 16

In a similar manner to Example 1 except for the use of, as the apatite type compound-forming component, 469 g (calcium monohydrogenphosphate dihydrate: pure water= 117 g: 351 g) of a 25 wt. % suspension of calcium monohydrogenphosphate dihydrate having an average particle size of 10 $\mu$m and 232 g (calcium carbonate: pure water=58 g: 174 g) of a 25 wt. % suspension of ground calcium carbonate having an average particle size of 1.5 $\mu$m, an injection molded product was obtained. As a result of calculation, the content of the apatite type compound-forming component was 10.4 wt. % and a molar ratio of a metal element to phosphorus was 1.85. The polymer thus obtained was found to have a weight-average molecular weight of 32000. The measurement results by incineration showed that the content of the apatite type compound was 9.3 wt. %. Based on the results of the quantitative determination of calcium and phosphorus by inductively coupled plasma emission spectrometry, a molar ratio of calcium to phosphorus was calculated to be 1.88. The measurement results of the physical properties of the molded product thus obtained are shown in Table 5.

EXAMPLE 17

In a similar manner to Example 1 except for the use of, as the apatite type compound-forming component, 100 g of a 25 wt. % suspension of calcium monohydrogenphosphate dihydrate (calcium monohydrogenphosphate dihydrate: pure water=25 g: 75 g) having an average particle size of 10 $\mu$m and 232 g of a 25 wt. % suspension of ground calcium carbonate (calcium carbonate: pure water=58 g: 174 g) having an average particle size of 1.5 $\mu$m, an injection molded product was obtained. As a result of calculation, the content of the apatite type compound-forming component was 5.2 wt. % and a molar ratio of a metal element to phosphorus was 5.0. The polymer thus obtained was found to have a weight-average molecular weight of 26000. The measurement results by incineration showed that the content of the apatite the compound was 4.3 wt. %. Based on the results of the quantitative determination of calcium and phosphorus by inductively coupled plasma emission spectrometry, a molar ratio of calcium to phosphorus was calculated to be 5.2. The measurement results of the physical properties of the molded product are shown in Table 5.

EXAMPLE 18

In a similar manner to Example 1 except for the use of, as the apatite type compound-forming component, 80 g (calcium monohydrogenphosphate dihydrate: pure water= 20 g: 60 g) of a 25 wt. % suspension of calcium monohydrogenphosphate dihydrate having an average particle size of 10 $\mu$m and 464 g (calcium carbonate: pure water=116 g: 348 g) of a 25 wt. % suspension of ground calcium carbonate having an average particle size of 1.5 $\mu$m, an injection molded product was obtained. As a result of calculation, the content of the apatite type compound-forming component was 8.3 wt. % and a molar ratio of a metal element to phosphorus was 11.0. The polymer thus obtained was found to have a weight-average molecular weight of 22000. The measurement results by incineration showed that the content of the apatite the compound was 6.5 wt. %. Based on the results of the quantitative determination of calcium and phosphorus by inductively coupled plasma emission spectrometry, a molar ratio of calcium to phosphorus was calculated to be 11.2. The measurement results of the physical properties of the molded product are shown in Table 5.

EXAMPLE 19

In a similar manner to Example 6 except that 3.0 Kg of an equimolar solid salt of hexamethylenediamine adipate as the polyamide-forming component and 200 g of calcium monohydrogenphosphate dihydrate having an average particle size of 10 $\mu$m and 28.5 g of phosphoric acid as the apatite type compound-forming component were mixed thoroughly in a Henschel mixer and the resulting mixture was charged in a 5-liter autoclave, pellets were obtained. As a result of calculation, the content of the apatite type compound-forming component was 7.1 wt. % and a molar ratio of a metal element to phosphorus was 0.8. The polymer thus obtained was found to have a weight-average molecular weight of 20000. The measurement results by incineration showed that the content of the apatite the compound was 6.0 wt. %. Based on the results of the quantitative determination of calcium and phosphorus by inductively coupled plasma emission spectrometry, a molar ratio of calcium to phosphorus was calculated to be 0.79. The measurement results of the physical properties of the molded product are shown in Table 5.

EXAMPLE 20

In a similar manner to Example 1 except for the use of, as the apatite type compound-forming component, 600 g (anhydrous calcium monohydrogenphosphate: pure water=150 g: 450 g) of a 25 wt. % suspension of anhydrous calcium monohydrogenphosphate ($CaHPO_4$) having an average particle size of 1.0 $\mu$m and 216 g (calcium hydroxide: pure water=54 g: 162 g) of a 25 wt. % suspension of calcium hydroxide ($Ca(OH)_2$) having an average particle size of 10 $\mu$m, a molded product was obtained. The measurement results of the physical properties of the molded product thus obtained are shown in Table 6.

EXAMPLE 21

In a similar manner to Example 1 except for the use of, as the apatite type compound-forming component, 600 g (tricalcium phosphate: pure water=150 g: 450 g) of a 25 wt. % suspension of tricalcium phosphate ($Ca_3(PO_4)_2$) having an average particle size of 10 $\mu$m and 60 g (calcium hydroxide: pure water 12 g: 48 g) of a 25 wt. % suspension of calcium hydroxide having an average particle size of 10 $\mu$m, a molded product was obtained. The measurement results of the physical properties of the molded product thus obtained are shown in Table 6.

EXAMPLE 22

In a similar manner to Example 1 except for the use of, as the apatite type compound-forming component, 600 g (calcium dihydrogendiphosphate: pure water=150 g: 450 g) of a 25 wt. % suspension of calcium dihydrogendiphosphate monohydrate ($CaH_2P_2O_7$) having an average particle size of 10 $\mu$m and 400 g (calcium hydroxide: pure water=100 g: 300 g) of a 25 wt. % suspension of calcium hydroxide having an average particle size of 10 $\mu$m, a molded product was obtained. The measurement results of the physical properties of the molded product thus obtained are shown in Table 6.

EXAMPLE 23

In a similar manner to Example 1 except for the use of, as the apatite type compound-forming component, 300 g (calcium dihydrogenphosphate monohydrate: pure water= 75 g: 225 g) of a 25 wt. % suspension of calcium bis (dihydrogenphosphate) monohydrate ($Ca(HPO_4)_2 \cdot H_2O$) having an average particle size of 10 $\mu$m and 288 g (calcium carbonate: pure water=72 g: 216 g) of a 25 wt. % suspension of ground calcium carbonate having an average particle size of 1.5 $\mu$m, a molded product was obtained. The measurement results of the physical properties of the molded product thus obtained are shown in Table 6.

EXAMPLE 24

In a similar manner to Example 1 except for the use of, as the apatite type compound-forming component, 600 g (calcium diphosphate phosphoric acid: pure water=150 g 450 g) of a 25 wt. % suspension of calcium diphosphate ($Ca_2P_2O_7$) having an average particle size of 10 $\mu$m and 320 g (calcium carbonate: pure water=80 g: 240 g) of a 25 wt. % suspension of ground calcium carbonate having an average particle size of 1.5 $\mu$m, a molded product was obtained. The measurement results of the physical properties of the molded product thus obtained are shown in Table 6.

EXAMPLE 25

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 10 $\mu$m, 220 g (calcium carbonate: pure water=55 g: 165 g) of a 25 wt. % suspension of ground calcium carbonate having an average particle size of 1.5 $\mu$m and 10 g (calcium fluoride: pure water=2.5 g: 7.5 g) of a 25 wt. % suspension of calcium fluoride ($CaF_2$) having an average particle size of 5.0 $\mu$m, a molded product was obtained. The measurement results of the physical properties of the molded product thus obtained are shown in Table 7.

EXAMPLE 26

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 10 $\mu$m, 176 g (calcium carbonate: pure water=44 g: 132 g) of a 25 wt. % suspension of ground calcium carbonate having an average particle size of 1.5 $\mu$m and 44 g calcium fluoride: pure water=11 g: 33 g) of a 25 wt. % suspension of calcium fluoride ($CaF_2$) having an average particle size of 5.0 $\mu$m, a molded product was obtained. The measurement results of the physical properties of the molded product thus obtained are shown in Table 7.

EXAMPLE 27

In a similar manner to Example 1 except for the use of, as an apatite type compound-forming component, 600 g (calcium monohydrogenphosphate dihydrate: pure water= 150 g: 450 g) of a 25 wt. % suspension of calcium monohydrogenphosphate dihydrate having an average particle size of 10 μm, 200 g (calcium carbonate: pure water=50 g: 150 g) of a 25 wt. % suspension of ground calcium carbonate having an average particle size of 1.5 μm and 36 g (calcium chloride pure water=9 g: 27 g) of a 25 wt. % suspension of calcium chloride (CaCl$_2$) having an average particle size of 5.0 μm, a molded product was obtained. The measurement results of the physical properties of the molded product thus obtained are shown in Table 7.

EXAMPLE 28

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 10 μm, 200 g (calcium carbonate: pure water=50 g: 150 g) of a 25 wt. % suspension of ground calcium carbonate having an average particle size of 1.5 μm and 248 g (strontium carbonate: pure water=12 g: 36 g) of a 25 wt. % suspension of strontium carbonate (SrCO$_3$) having an average particle size of 10 μm, a molded product was obtained. The measurement results of the physical properties of the molded product thus obtained are shown in Table 7.

EXAMPLE 29

In a similar manner to Example 1 except for the use of, as the apatite type compound-forming component, 600 g (calcium monohydrogenphosphate dihydrate: pure water= 150 g 450 g) of a 25 wt. % suspension of calcium monohydrogenphosphate dihydrate having an average particle size of 10 μm, 200 g (calcium carbonate: pure water=50 g: 150 g) of a 25 wt. % suspension of ground calcium carbonate having an average particle size of 1.5 μm and 64 g (barium carbonate: pure water=16 g: 48 g) of a 25 wt. % suspension of barium carbonate (BaCO$_3$) having an average particle size of 10 μm, a molded product was obtained. The measurement results of the physical properties of the molded product thus obtained are shown in Table 7.

EXAMPLE 30

In a similar manner to Example 1 except for the use of, as the apatite type compound-forming component, 540 g (calcium monohydrogenphosphate dihydrate: pure water= 135 g: 405 g) of a 25 wt. % suspension of calcium monohydrogenphosphate dihydrate having an average particle size of 10 μm, 60 g (magnesium phosphate dibasic trihydrate: pure water=15 g: 45 g) of a 25 wt. % suspension of magnesium phosphate dibasic trihydrate (MgHP$_4$.3H$_2$O) having an average particle size of 5.0 μm and 172 g (calcium hydroxide: pure water=43 g 129 g) of a 25 wt. % suspension of ground calcium carbonate having an average particle size of 10 μm, a molded product was obtained. The measurement results of the physical properties of the molded product thus obtained are shown in Table 7.

EXAMPLE 31

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 10 μm, 160 g (calcium hydroxide: pure water=40 g: 120 g) of a 25 wt. % suspension of calcium hydroxide having an average particle size of 10 μm and 32 g (iron(II) chloride tetrahydrate: pure water=8 g: 24 g) of a 25 wt. % suspension of iron(II) chloride tetrahydrate having an average particle size of 10 μm, a molded product was obtained. The measurement results of the physical properties of the molded product thus obtained are shown in Table 8.

EXAMPLE 32

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 10 μm, 160 g (calcium hydroxide: pure water=40 g: 120 g) of a 25 wt. % suspension of calcium hydroxide having an average particle size of 10 μm and 44 g (iron(III) chloride hexahydrate: pure water=11 g: 33 g) of a 25 wt. % suspension of iron(III) chloride hexahydrate (FCl$_3$.6H$_2$O) having an average particle size of 10 μm, a molded product was obtained. The measurement results of the physical properties of the molded product thus obtained are shown in Table 8.

EXAMPLE 33

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 10 μm, 160 g (calcium hydroxide: pure water=40 g: 120 g) of a 25 wt. % suspension of calcium hydroxide having an average particle size of 10 μm and 32 g (copper iodide: pure water=8 g: 24 g) of a 25 wt. % suspension of copper iodide (CuI) having an average particle size of 10 μm, a molded product was obtained. The measurement results of the physical properties of the molded product thus obtained are shown in Table 8.

EXAMPLE 34

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 25.0 μm and 232 g (calcium carbonate: pure water 58 g: 174 g) of a 25 wt. % suspension of ground calcium carbonate having an average particle size of 1.5 μm, a molded product was obtained. Observation results of the molded product under a transmission microscope showed that the apatite type compound had an average particle size of 0.52 μm. The measurement results of the physical properties of the molded product thus obtained are shown in Table 9.

EXAMPLE 35

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 75.0 μm and 232 g (calcium carbonate: pure water= 58 g: 174 g) of a 25 wt. % suspension of ground calcium carbonate having an average particle size of 1.5 μm, a molded product was obtained. Observation results of the molded product under a transmission microscope showed that the apatite type compound had an average particle size of 0.88 μm. The measurement results of the physical properties of the molded product thus obtained are shown in Table 9.

COMPARATIVE EXAMPLE 4

In a similar manner to Example 1 except for the use of, as the apatite type compound-forming component, 600 g (calcium monohydrogenphosphate dihydrate: pure water= 150 g: 450 g) of a 25 wt. % suspension of calcium monohydrogenphosphate dihydrate having an average particle size of 200 μm and 232 g (calcium hydroxide: pure water=58 g: 174 g) of a 25 wt. % suspension of ground calcium carbonate having an average particle size of 1.5 μm, a molded product was obtained. Observation results of the molded product under a transmission microscope showed that the apatite type compound had an average particle size of 1.83 μm. The measurement results of the physical properties of the molded product thus obtained are shown in Table 9.

EXAMPLE 36

In a similar manner to Example 1 except that a 25 wt. % suspension of calcium monohydrogenphosphate dihydrate having an average particle size of 10 μm and a 25 wt. % suspension of ground calcium carbonate having an average particle size of 1.5 μm used as the apatite type compound-forming component were subjected to ultrasonic treatment at 40° C. for 30 minutes, a molded product was obtained. The measurement results of the physical properties of the molded product thus obtained are shown in Table 10.

EXAMPLE 37

In a similar manner to Example 1 except that a 25 wt. % suspension of calcium monohydrogenphosphate dehydrate having an average particle size of 10 μm and a 25 wt. % suspension of ground calcium carbonate having an average particle size of 1.5 μm used as the apatite type compound-forming component were treated in a homogenizer at 60° C. for 10 minutes, a molded product was obtained. The measurement results of the physical properties of the molded product thus obtained are shown in Table 10.

EXAMPLE 38

In a similar manner to Example 1 except that as a dispersant, 6 g of ammonium polyacrylate ("Ceramo D-134" produced by Dai-ichi Kogyo Seiyaku Co., Ltd.) was added to a 25 wt. % suspension of calcium monohydrogenphosphate dihydrate having an average particle size of 3.0 μm and 2.32 g of ammonium polyacrylate was added to a 25 wt. % suspension of ground calcium carbonate having an average particle size of 0.25 μm and the resulting mixtures were each subjected to ultrasonic treatment at 40° C. for 30 minutes, a molded product was obtained. The polymer thus obtained was subjected to eluting and separating operations with a 90 wt. % aqueous phenol solution. Concerning the apatite type compound thus obtained, the heating loss ratio X as measured by thermogravimetric analysis was 12.7 (parts by weight/100 parts by weight of the apatite), Sb/(Sa+Sb) as measured by pyrolysis GC was 0.75 and the amount of the organic substance was calculated to be 9.5 (parts by weight/100 parts by weight of the apatite). As a result of the analysis of pyrolysis GC and mass spectrum of the apatite type compound, existence of both cyclopentanone and adiponitrile, that is, pyrolytically decomposed components were confirmed. In addition, from the observation through infrared absorption spectrum, peaks indicating the existence of the organic substances were confirmed at 1550 $cm^{-1}$ and 1650 $cm^{-1}$. The measurement results of the physical properties of the molded product thus obtained are shown in Table 10.

EXAMPLE 39

In a similar manner to Example 1 except that as a dispersant, 6 g of sodium polyacrylate ("Sharol AN-103P" produced by Dai-ichi Kogyo Seiyaku Co., Ltd.) was added to a 25 wt. % suspension of calcium monohydrogenphosphate dihydrate having an average particle size of 3.0 μm and 2.32 g of sodium polyacrylate was added to a 25 wt. % suspension of ground calcium carbonate having an average particle size of 0.25 μm and the resulting mixtures were each subjected to ultrasonic treatment at 40° C. for 30 minutes, a molded product was obtained. The measurement results of the physical properties of the molded product thus obtained are shown in Table 10.

EXAMPLE 40

In a similar manner to Example 1 except that as a dispersant, 1.2 g of sodium citrate (produced by SHOWA KAKO CORPORATION) was added to a 25 wt. % suspension of calcium monohydrogenpho5phate dihydrate having an average particle size of 3.0 μm and 0.46 g of sodium citrate was added to a 25 wt. % suspension of ground calcium carbonate having an average particle size of 0.25 μm and the resulting mixtures were each subjected to ultrasonic treatment at 40° C. for 30 minutes, a molded product was obtained. The measurement results of the physical properties of the molded product thus obtained are shown in Table 10.

EXAMPLE 41

In a similar manner to Example 1 except that as a dispersant, 6 g of sucrose stearate ester ("DK Ester" produced by Dai-ichi Kogyo Seiyaku Co., Ltd.) was added to a 25 wt. % suspension of calcium monohydrogenphosphate dihydrate having an average particle size of 3.0 μm and 2.32 g of sucrose stearate ester was added to a 25 wt. % suspension of ground calcium carbonate having an average particle size of 0.25 μm and the resulting mixtures were each subjected to ultrasonic treatment at 40° C. for 30 minutes, a molded product was obtained. The measurement results of the physical properties of the molded product thus obtained are shown in Table 10.

EXAMPLE 42

As a polyamide-forming component, an aqueous solution obtained by dissolving 1.5 Kg of an equimolar solid salt of hexamethylenediamine adipate in 1.5 Kg of pure water of 50° C. was used. As an apatite type compound-forming component, 600 g (calcium monohydrogenphosphate dihydrate pure water=150 g: 450 g) of a 25 wt. % suspension of calcium monohydrogenphosphate dihydrate having an average particle size of 3.0 μm and 232 g (calcium carbonate: pure water=58 g: 174 g) of a 25 wt. % suspension of ground calcium carbonate having an average particle size of 1.5 μm were used. The polyamide-forming component and apatite type compound-forming component were charged in a 5-liter autoclave, followed by the addition of 10 g of ethylenediaminetetraacetic acid (EDTA) as a complexing agent. The resulting mixture was stirred thoroughly at 50° C. The reaction mixture was thereafter treated in a similar manner to Example 1. The measurement results of the physical properties of the molded product thus obtained are shown in Table 11.

EXAMPLE 43

In a similar manner to Example 42 except for the use of 10 g of ethylenediamine (en) instead of 10 g of ethylenediaminetetraacetic acid (EDTA) as the complexing agent, a molded product was obtained. The measurement results of the physical properties of the molded product thus obtained are shown in Table 11.

EXAMPLE 44

With 4 Kg of a pulverized (dried) polymer obtained in a similar manner to Example 1 was mixed 1 Kg of a rubber ("Tuftec M1943" produced by Asahi Chemical Industry Co., Ltd.; rubber modified with maleic anhydride). The resulting mixture was extruded into pellets at 280° C. by using a twin-screw extruder ("TEM35", manufactured by Toshiba Machine Co., Ltd.), followed by injection molding, whereby a molded product was obtained. The measurement results of the physical properties of the molded product thus obtained are shown in Table 11.

EXAMPLE 45

With 3.75 Kg of a pulverized (dried) polymer obtained in a similar manner to Example 1 was mixed 1 Kg of GF ("FT756" produced by Asahi Fiber Glass Co., Ltd.) having a diameter of 10 $\mu$m. The resulting mixture was extruded into pellets at 280° C. by a twin-screw extruder ("TEM35", manufactured by Toshiba Machine Co., Ltd.), followed by injection molding, whereby a molded product was obtained. The measurement results of the physical properties of the molded product thus obtained are shown in Table 12.

COMPARATIVE EXAMPLE 5

With 4 Kg of nylon 66 ("Leona 1300", produced by Asahi Chemical Co., Ltd.) was mixed with 1 Kg of a rubber ("Tuftec M1943" produced by Asahi Chemical Industry Co., Ltd.; rubber modified with maleic anhydride). The resulting mixture was extruded into pellets at 280° C. by a twin-screw extruder ("TEM35", manufactured by Toshiba Machine Co., Ltd.), followed by injection molding, whereby a molded product was obtained. The measurement results of the physical properties of the molded product thus obtained are shown in Table 12.

COMPARATIVE EXAMPLE 6

With 3.75 Kg of nylon 66 ("Leona 1300", produced by Asahi Chemical Industry Co., Ltd.) was mixed 1 Kg of GF ("FT756" produced by Asahi Fiber Glass Co., Ltd.) having a diameter of 10 $\mu$m. The resulting mixture was extruded into pellets at 280° C. by a twin-screw extruder ("TEM35", manufactured by Toshiba Machine Co., Ltd.), followed by injection molding, whereby a molded product was obtained. The measurement results of the physical properties of the molded product thus obtained are shown in Table 12.

TABLE 1

|  | Unit | Ex. 1 | Comp. Ex. 1 | Ex. 2 | Ex. 3 | Ex. 4 | Ex. 5 |
|---|---|---|---|---|---|---|---|
| Properties of forming components |  |  |  |  |  |  |  |
| 1) Content of apatite type compound-forming component | wt. % | 12.2 | 10.0 | 12.2 | 12.2 | 12.2 | 12.2 |
| 2) Molar ratio of metal element to phosphorus |  | 1.67 | 1.67 | 1.67 | 1.67 | 1.67 | 1.67 |
| Properties of polyamide resin composition |  |  |  |  |  |  |  |
| 1) Kind of nylon |  | Ny66 | Ny66 | Ny66/61 | Ny612 | Ny6/66 | Ny6 |
| 2) Weight-average molecular weight (Mw) |  | 36000 | 36000 | 35000 | 33000 | 35000 | 35000 |
| 3) Content of apatite type compound | wt. % | 10.2 | 10.1 | 10.0 | 10.1 | 10.0 | 10.0 |
| 4) Molar ratio of metal element to phosphorus |  | 1.67 | 1.66 | 1.67 | 1.67 | 1.67 | 1.67 |
| 5) Amount of organic substance | part by weight/100 parts by weight of apatite type compound | 4.5 | 0.15 | 4.2 | 4.5 | 4.0 | 4.0 |
| Physical properties of polyamide resin composition |  |  |  |  |  |  |  |
| 1) Flexural modulus | Kg/cm$^2$ | 45000 | 34000 | 42500 | 34000 | 37500 | 40000 |
| 2) Flexural strength | Kg/cm$^2$ | 1500 | 1250 | 1450 | 1250 | 1300 | 1350 |
| 3) Tensile strength | Kg/cm$^2$ | 1000 | 620 | 980 | 700 | 900 | 880 |
| 4) Tensile elongation | % | 12.5 | 4.5 | 10.0 | 25 | 25 | 25 |
| 5) Notched Izod impact strength (23° C.) | Kg · cm/cm | 4.5 | 3.4 | 4.0 | 4.5 | 4.5 | 4.5 |

TABLE 1-continued

|  | Unit | Ex. 1 | Comp. Ex. 1 | Ex. 2 | Ex. 3 | Ex. 4 | Ex. 5 |
|---|---|---|---|---|---|---|---|
| 6) Deflection temperature under load (load: 18.6 Kg/cm$^2$) | °C. | 135 | 90 | 125 | 130 | 115 | 120 |
| 7) Water absorption (in water of 23° C. for 24 hrs) | wt. % | 0.8 | 1.1 | 0.5 | 0.1 | 0.9 | 0.9 |
| 8) Compressive Creep (amount of strain) | mm | 0.7 | 1.2 | 0.75 | 1.0 | 0.75 | 0.75 |
| 9) Amount of warpage | mm | 0.7 | 1.0 | 0.4 | 0.5 | 0.8 | 0.75 |
| 10) Volumetric shrinkage rate | % | 2.0 | 4.5 | 1.5 | 1.5 | 2.5 | 2.5 |
| 11) Modulus in flexure after water absorption | Kg/cm$^2$ | 22500 | 13000 | 25000 | 30000 | 19000 | 20000 |

TABLE 2

|  | Unit | Example 6 | Example 7 | Comp. Ex. 2 | Ref. Ex. 2 |
|---|---|---|---|---|---|
| Properties of forming components |  |  |  |  |  |
| 1) Content of apatite type compound-forming component | wt. % | 6.3 | 3.2 | 0.35 | 0 |
| 2) Molar ratio of metal element to phosphorus |  | 1.00 | 1.00 | 1.00 | — |
| Properties of polyamide resin composition |  |  |  |  |  |
| 1) Kind of nylon |  | Ny66 | Ny66 | Ny66 | Ny66 |
| 2) Weight-average molecular weight (Mw) |  | 210000 | 520000 | 70000 | 35000 |
| 3) Content of apatite type compound | wt. % | 5.2 | 2.5 | 0.21 | — |
| 4) Molar ratio of metal element to phosphorus |  | 1.01 | 0.95 | 0.95 | — |
| 5) Amount of organic substance | part by weight/100 parts by weight of apatite type compound | 4.1 | 5.0 | 4.5 | — |
| Physical properties of polyamide resin composition |  |  |  |  |  |
| 1) Flexural modulus | Kg/cm$^2$ | 37000 | 35000 | 29000 | 28000 |
| 2) Flexural strength | Kg/cm$^2$ | 1350 | 1300 | 1200 | 1200 |
| 3) Tensile strength | Kg/cm$^2$ | 950 | 950 | 825 | 820 |
| 4) Tensile elongation | % | 15.0 | 15.0 | 25.0 | 25.0 |
| 5) Notched Izod impact strength (23° C.) | Kg · cm/cm | 5.5 | 5.7 | 5.7 | 5.5 |
| 6) Deflection temperature under load (load: 18.6 Kg/cm$^2$) | °C. | 120 | 110 | 77 | 75 |
| 7) Water absorption (in water of 23° C. for 24 hrs) | wt. % | 0.85 | 0.85 | 1.2 | 1.2 |
| 8) Compressive Creep (amount of strain) | mm | 0.7 | 0.7 | 1.2 | 1.2 |
| 9) Amount of warpage | mm | 0.8 | 0.8 | 1.1 | 1.1 |
| 10) Volumetric shrinkage rate | % | 2.7 | 2.7 | 4.2 | 4.2 |
| 11) Modulus in flexure after water absorption | Kg/cm$^2$ | 20000 | 18000 | 13000 | 13000 |

TABLE 3

|  | Unit | Example 8 | Example 9 | Example 10 | Example 11 | Example 12 |
| --- | --- | --- | --- | --- | --- | --- |
| Properties of forming components |  |  |  |  |  |  |
| 1) Content of apatite type compound-forming component | wt. % | 12.2 | 10.0 | 12.2 | 12.2 | 12.2 |
| 2) Molecular weight control agent added |  | Acetic acid | Adipic acid | Stearyl-amine | Aniline | Acetic acid |
| 3) Amount of molecular weight control agent | part by weight/100 parts by weight of polyamide-forming component | 0.3 | 0.65 | 1.3 | 0.93 | 1.3 |
| 4) Molar ratio of metal element to phosphorus |  | 1.67 | 1.67 | 1.67 | 1.67 | 1.67 |
| Properties of polyamide resin composition |  |  |  |  |  |  |
| 1) Kind of nylon |  | Ny66 | Ny66 | Ny66 | Ny66 | Ny66 |
| 2) Weight-average molecular weight (Mw) |  | 42000 | 37000 | 32000 | 21000 | 18000 |
| 3) Content of apatite type compound | wt. % | 10.2 | 10.0 | 10.0 | 10.1 | 10.0 |
| 4) Molar ratio of metal element to phosphorus |  | 1.67 | 1.67 | 1.67 | 1.67 | 1.67 |
| 5) Amount of organic substance | part by weight/ 100 parts by weight of apatite type compound | 4.5 | 4.5 | 4.2 | 4.3 | 4.1 |
| Physical properties of polyamide resin composition |  |  |  |  |  |  |
| 1) Flexural modulus | Kg/cm$^2$ | 45000 | 45000 | 45000 | 45000 | 45000 |
| 2) Flexural strength | Kg/cm$^2$ | 1500 | 1500 | 1500 | 1500 | 1500 |
| 3) Tensile strength | Kg/cm$^2$ | 1000 | 980 | 980 | 980 | 650 |
| 4) Tensile elongation | % | 12.5 | 12.5 | 12.5 | 9.0 | 8.5 |
| 5) Notched Izod impact strength (23° C.) | Kg · cm/cm | 4.0 | 4.0 | 4.0 | 3.8 | 3.5 |
| 6) Deflection temperature under load (load: 18.6 Kg/cm$^2$) | ° C. | 135 | 135 | 135 | 135 | 135 |
| 7) Water absorption (in water of 23° C. for 24 hrs) | wt. % | 0.8 | 0.8 | 0.7 | 0.7 | 0.9 |
| 8) Compressive Creep (amount of strain) | mm | 0.7 | 0.7 | 0.7 | 0.7 | 0.7 |
| 9) Amount of warpage | mm | 0.7 | 0.7 | 0.7 | 0.7 | 0.65 |
| 10) Volumetric shrinkage rate | % | 2.0 | 4.5 | 1.5 | 1.5 | 1.5 |
| 11) Modulus in flexure after water absorption | Kg/cm$^2$ | 22500 | 22500 | 24000 | 24000 | 20000 |

TABLE 4

|  | Unit | Example 13 | Example 14 | Comp. Ex. 3 |
| --- | --- | --- | --- | --- |
| Properties of forming components |  |  |  |  |
| 1) Content of apatite type compound-forming component | wt. % | 25.8 | 40.9 | 63.4 |
| 2) Molar ratio of metal element to phosphorus |  | 1.67 | 1.67 | 1.67 |
| Properties of polyamide resin composition |  |  |  |  |
| 1) Kind of nylon |  | Ny66 | Ny66 | Ny66 |
| 2) Weight-average molecular weight (Mw) |  | 35000 | 32000 | 14000 |
| 3) Content of apatite type compound | wt. % | 22.3 | 39.1 | 61.2 |
| 4) Molar ratio of metal element to phosphorus |  | 1.67 | 1.66 | 1.67 |

TABLE 4-continued

|  | Unit | Example 13 | Example 14 | Comp. Ex. 3 |
|---|---|---|---|---|
| 5) Amount of organic substance | part by weight/100 parts by weight of apatite type compound | 4.5 | 4.6 | 4.2 |
| Physical properties of polyamide resin composition |  |  |  |  |
| 1) Flexural modulus | Kg/cm$^2$ | 57000 | 80000 | Could not be molded |
| 2) Flexural strength | Kg/cm$^2$ | 1700 | 1900 |  |
| 3) Tensile strength | Kg/cm$^2$ | 1100 | 1250 |  |
| 4) Tensile elongation | % | 10.0 | 8.0 |  |
| 5) Notched Izod impact strength (23° C.) | Kg · cm/cm | 4.0 | 4.0 |  |
| 6) Deflection temperature under load (load: 18.6 Kg/cm$^2$) | ° C. | 150 | 155 |  |
| 7) Water absorption (in water of 23° C. for 24 hrs) | wt. % | 0.6 | 0.5 |  |
| 8) Compressive Creep amount of strain) | mm | 0.5 | 0.3 |  |
| 9) Amount of warpage | mm | 0.5 | 0.3 |  |
| 10) Volumetric shrinkage rate | % | 1.5 | 1.2 |  |
| 11) Modulus in flexure after water absorption | Kg/cm$^2$ | 30000 | 40000 |  |

TABLE 5

|  | Unit | Example 15 | Example 16 | Example 17 | Example 18 | Example 19 |
|---|---|---|---|---|---|---|
| Properties of forming components |  |  |  |  |  |  |
| 1) Content of apatite type compound-forming component | wt. % | 10.4 | 10.4 | 5.2 | 8.3 | 7.1 |
| 2) Molar ratio of metal element to phosphorus |  | 1.30 | 1.85 | 5.0 | 11.0 | 0.8 |
| Properties of polyamide resin composition |  |  |  |  |  |  |
| 1) Kind of nylon |  | Ny66 | Ny66 | Ny66 | Ny66 | Ny66 |
| 2) Weight-average molecular weight (Mw) |  | 38000 | 32000 | 26000 | 22000 | 20000 |
| 3) Content of apatite type compound | wt. % | 9.2 | 9.3 | 4.3 | 6.5 | 6.0 |
| 4) Molar ratio of metal element to phosphorus |  | 1.28 | 1.88 | 5.27 | 11.2 | 0.79 |
| 5) Amount of organic substance | part by weight/100 parts by weight of apatite type compound | 4.3 | 4.5 | 4.2 | 3.0 | 3.2 |
| Physical properties of polyamide resin composition |  |  |  |  |  |  |
| 1) Flexural modulus | Kg/cm$^2$ | 40000 | 40000 | 37000 | 37000 | 32000 |
| 2) Flexural strength | Kg/cm$^2$ | 1350 | 1350 | 1350 | 1300 | 1250 |
| 3) Tensile strength | Kg/cm$^2$ | 920 | 920 | 900 | 650 | 650 |
| 4) Tensile elongation | % | 12.5 | 12.5 | 10.0 | 8.5 | 8.5 |
| 5) Notched Izod impact strength 23° C. | Kg · cm/cm | 4.5 | 4.5 | 4.0 | 3.0 | 3.0 |
| 6) Deflection temperature under load (load: 18.6 Kg/cm$^2$) | ° C. | 125 | 125 | 120 | 100 | 95 |
| 7) Water absorption (in water of 23° C. for 24 hrs) | wt. % | 0.8 | 0.8 | 0.85 | 1.0 | 1.0 |
| 8) Compressive Creep (amount of strain) | mm | 0.75 | 0.75 | 0.8 | 0.9 | 1.0 |

TABLE 5-continued

|  | Unit | Example 15 | Example 16 | Example 17 | Example 18 | Example 19 |
|---|---|---|---|---|---|---|
| 9) Amount of warpage | mm | 0.75 | 0.75 | 0.8 | 0.9 | 1.0 |
| 10) Volumetric shrinkage rate | % | 2.5 | 2.5 | 3.0 | 4.0 | 4.0 |
| 11) Modulus in flexure after water absorption | Kg/cm$^2$ | 21500 | 21500 | 20000 | 17000 | 15000 |

TABLE 6

|  | Unit | Example 20 | Example 21 | Example 22 | Example 23 | Example 24 |
|---|---|---|---|---|---|---|
| Properties of forming components | | | | | | |
| 1) Content of apatite type compound-forming component | wt. % | 12.0 | 9.8 | 14.3 | 19.5 | 13.3 |
| 2) Molar ratio of metal element to phosphorus | | 1.67 | 1.67 | 1.47 | 1.71 | 1.67 |
| Properties of polyamide resin composition | | | | | | |
| 1) Kind of nylon | | Ny66 | Ny66 | Ny66 | Ny66 | Ny66 |
| 2) Weight-average molecular weight (Mw) | | 36000 | 36000 | 35000 | 33000 | 35000 |
| 3) Content of apatite type compound | wt. % | 10.2 | 8.5 | 12.0 | 17.1 | 11.2 |
| 4) Molar ratio of metal element to phosphorus | | 1.66 | 1.67 | 1.45 | 1.70 | 1.67 |
| 5) Amount of organic substance | part by weight/100 parts by weight of apatite type compound | 4.5 | 4.0 | 4.0 | 4.0 | 4.5 |
| Physical properties of polyamide resin composition | | | | | | |
| 1) Flexural modulus | Kg/cm$^2$ | 45000 | 37000 | 39000 | 42000 | 42000 |
| 2) Flexural strength | Kg/cm$^2$ | 1500 | 1300 | 1300 | 1350 | 1350 |
| 3) Tensile strength | Kg/cm$^2$ | 1000 | 880 | 880 | 920 | 920 |
| 4) Tensile elongation | % | 11.0 | 10.0 | 10.0 | 10.0 | 11.0 |
| 5) Notched Izod impact strength (23° C.) | Kg · cm/cm | 4.7 | 4.5 | 4.0 | 4.5 | 4.5 |
| 6) Deflection temperature under load (load: 18.6 Kg/cm$^2$) | ° C. | 135 | 120 | 120 | 125 | 120 |
| 7) Water absorption (in water of 23° C. for 24 hrs) | wt. % | 0.8 | 0.9 | 0.9 | 0.7 | 0.8 |
| 8) Compressive Creep (amount of strain) | mm | 0.7 | 0.9 | 0.9 | 0.8 | 0.8 |
| 9) Amount of warpage | mm | 0.7 | 0.8 | 0.8 | 0.7 | 0.75 |
| 10) Volumetric shrinkage rate | % | 2.0 | 3.0 | 3.0 | 2.0 | 2.5 |
| 11) Modulus in flexure after water absorption | Kg/cm$^2$ | 22500 | 19000 | 20000 | 23500 | 22000 |

TABLE 7

|  | Unit | Ex. 25 | Ex. 26 | Ex. 27 | Ex. 28 | Ex. 29 | Ex. 30 |
|---|---|---|---|---|---|---|---|
| Properties of forming components | | | | | | | |
| Content of apatite type compound-forming component | wt. % | 12.2 | 12.0 | 12.2 | 12.4 | 12.6 | 11.4 |
| Molar ratio of metal element to phosphorus | | 1.67 | 1.67 | 1.67 | 1.67 | 1.67 | 1.67 |

TABLE 7-continued

|  | Unit | Ex. 25 | Ex. 26 | Ex. 27 | Ex. 28 | Ex. 29 | Ex. 30 |
|---|---|---|---|---|---|---|---|
| Properties of polyamide resin composition | | | | | | | |
| Kind of nylon | | Ny66 | Ny66 | Ny66 | Ny66 | Ny6 | Ny66 |
| Weight-average molecular weight (Mw) | | 36000 | 36000 | 36000 | 36000 | 36000 | 36000 |
| Content of apatite type compound | wt. % | 10.2 | 10.0 | 10.0 | 10.0 | 10.0 | 9.7 |
| Molar ratio of metal element to phosphorus | | 1.63 | 1.65 | 1.62 | 1.62 | 1.63 | 1.66 |
| Amount of organic substance | part by weight/100 parts by weight of apatite type compound | 4.5 | 4.5 | 4.5 | 4.5 | 4.5 | 4.5 |
| Physical properties of polyamide resin composition | | | | | | | |
| Flexural modulus | Kg/cm$^2$ | 47000 | 49000 | 40000 | 40000 | 40000 | 40000 |
| Flexural strength | Kg/cm$^2$ | 1500 | 1600 | 1350 | 1350 | 1350 | 1350 |
| Tensile strength | Kg/cm$^2$ | 1000 | 1020 | 950 | 950 | 950 | 950 |
| Tensile elongation | % | 10.0 | 10.0 | 10.0 | 10.0 | 10.0 | 10.0 |
| Notched Izod impact strength (23° C.) | Kg · cm/cm | 4.2 | 4.0 | 4.0 | 4.0 | 4.0 | 4.0 |
| Deflection temperature under load (load: 18.6 Kg/cm$^2$) | ° C. | 135 | 137 | 120 | 120 | 120 | 120 |
| Water absorption (in water of 23° C. for 24 hrs) | wt. % | 0.7 | 0.7 | 0.8 | 0.8 | 0.8 | 0.8 |
| Compressive Creep (amount of strain) | mm | 0.6 | 0.6 | 0.8 | 0.8 | 0.8 | 0.8 |
| Amount of warpage | mm | 0.6 | 0.6 | 0.7 | 0.7 | 0.7 | 0.7 |
| Volumetric shrinkage rate | % | 1.7 | 1.5 | 2.0 | 2.0 | 2.0 | 2.0 |
| Modulus in flexure after water absorption | Kg/cm$^2$ | 23500 | 23500 | 21000 | 21000 | 21000 | 21000 |

TABLE 8

|  | Unit | Example 31 | Example 32 | Example 33 |
|---|---|---|---|---|
| Properties of forming components | | | | |
| Content of apatite type compound-forming component | wt. % | 11.7 | 11.8 | 11.7 |
| Molar ratio of metal element to phosphorus | | 1.67 | 1.67 | 1.67 |
| Properties of polyamide resin composition | | | | |
| Kind of nylon | | Ny66 | Ny66 | Ny66 |
| Weight-average molecular weight (Mw) | | 36000 | 36000 | 35000 |
| Content of apatite type compound | wt. % | 9.7 | 10.6 | 10.0 |
| Molar ratio of metal element to phosphorus | | 1.64 | 1.65 | 1.67 |
| Amount of organic substance | part by weight/100 parts by weight of apatite type compound | 4.5 | 4.5 | 4.2 |
| Physical properties of polyamide resin composition | | | | |
| Flexural modulus | Kg/cm$^2$ | 40000 | 40000 | 40000 |
| Flexural strength | Kg/cm$^2$ | 1350 | 1350 | 1350 |
| Tensile strength | Kg/cm$^2$ | 950 | 950 | 950 |
| Tensile elongation | % | 10.0 | 10.0 | 10.0 |
| Notched Izod impact strength (23° C.) | Kg · cm/cm | 4.0 | 4.0 | 4.0 |
| Deflection temperature under load (load: 18.6 Kg/cm$^2$) | ° C. | 120 | 120 | 120 |
| Water absorption (in water of 23° C. for 24 hrs) | wt. % | 0.8 | 0.8 | 0.8 |
| Compressive Creep (amount of strain) | mm | 0.8 | 0.8 | 0.8 |
| Amount of warpage | mm | 0.7 | 0.7 | 0.7 |
| Volumetric shrinkage rate |  | 2.0 | 2.0 | 2.0 |
| Modulus in flexure after water absorption | Kg/cm$^2$ | 21000 | 21000 | 21000 |

TABLE 9

| | Unit | Example 34 | Example 35 | Comp. Ex. 4 |
|---|---|---|---|---|
| Properties of forming components | | | | |
| Content of apatite type compound-forming component | wt. % | 12.2 | 12.2 | 12.2 |
| Molar ratio of metal element to phosphorus | | 1.67 | 1.67 | 1.67 |
| Properties of polyamide resin composition | | | | |
| Kind of nylon | | Ny66 | Ny66 | Ny66 |
| Weight-average molecular weight (Mw) | | 36000 | 36000 | 36000 |
| Content of apatite type compound | wt. % | 10.2 | 10.0 | 10.0 |
| Molar ratio of metal element to phosphorus | | 1.66 | 1.66 | 1.67 |
| Amount of organic substance | part by weight/100 parts by weight of apatite type compound | 4.5 | 4.5 | 4.2 |

TABLE 9-continued

| | Unit | Example 34 | Example 35 | Comp. Ex. 4 |
|---|---|---|---|---|
| Physical properties of polyamide resin composition | | | | |
| Flexural modulus | Kg/cm$^2$ | 40000 | 38000 | 36000 |
| Flexural strength | Kg/cm$^2$ | 1350 | 1350 | 1250 |
| Tensile strength | Kg/cm$^2$ | 950 | 950 | 700 |
| Tensile elongation | % | 12.0 | 11.0 | 5.5 |
| Notched Izod impact strength (23° C.) | Kg · cm/cm | 4.5 | 4.5 | 3.0 |
| Deflection temperature under load (load: 18.6 Kg/cm$^2$) | ° C. | 120 | 120 | 115 |
| Water absorption (in water of 23° C. for 24 hrs) | wt. % | 0.8 | 0.8 | 0.9 |
| Compressive Creep (amount of strain) | mm | 0.8 | 0.8 | 0.9 |
| Amount of warpage | mm | 0.7 | 0.7 | 0.87 |
| Volumetric shrinkage rate | % | 2.0 | 2.0 | 3.0 |
| Modulus in flexure after water absorption | Kg/cm$^2$ | 21000 | 21000 | 15000 |

TABLE 10

| | Unit | Ex. 36 | Ex. 37 | Ex. 38 | Ex. 39 | Ex. 40 | Ex. 41 |
|---|---|---|---|---|---|---|---|
| Properties of forming components | | | | | | | |
| 1) Content of apatite type compound-forming component | wt. % | 12.2 | 12.2 | 12.2 | 12.2 | 12.2 | 12.2 |
| 2) Molar ratio of metal element to phophorus | | 1.67 | 1.67 | 1.67 | 1.67 | 1.67 | 1.67 |
| 3) Dispersant added | | | | NH$_4$ poly-acrylate | Na poly-acrylate | Na citrate | Sucrose stearate ester |
| Properties of polyamide resin composition | | | | | | | |
| 1) Kind of nylon | | Ny66 | Ny66 | Ny66 | Ny66 | Ny66 | Ny66 |
| 2) Weight-average molecular weight (Mw) | | 36000 | 36000 | 35000 | 32000 | 30000 | 32000 |
| 3) Content of apatite type compound | wt. % | 10.2 | 10.0 | 10.0 | 10.1 | 10.0 | 10.0 |
| 4) Molar ratio of metal element to phosphorus | | 1.67 | 1.67 | 1.67 | 1.67 | 1.67 | 1.67 |
| 5) Amount of organic substance | part by weight/100 parts by weight of apatite type compound | 5.0 | 5.0 | 9.5 | 8.5 | 8.0 | 7.0 |

TABLE 10-continued

|  | Unit | Ex. 36 | Ex. 37 | Ex. 38 | Ex. 39 | Ex. 40 | Ex. 41 |
|---|---|---|---|---|---|---|---|
| Physical properties of polyamide resin composition |  |  |  |  |  |  |  |
| 1) Flexural modulus | Kg/cm$^2$ | 45000 | 45000 | 45000 | 42500 | 42500 | 42500 |
| 2) Flexural strength | Kg/cm$^2$ | 1500 | 1500 | 1500 | 1400 | 1400 | 1400 |
| 3) Tensile strength | Kg/cm$^2$ | 1000 | 1000 | 1000 | 950 | 950 | 950 |
| 4) Tensile elongation | % | 15.0 | 15.0 | 19.0 | 18.5 | 15.0 | 15.0 |
| 5) Notched Izod impact strength (23° C.) | Kg · cm/cm | 4.5 | 4.5 | 6.5 | 6.5 | 6.0 | 6.0 |
| 6) Deflection temperature under load (load: 18.6 Kg/cm$^2$) | ° C. | 135 | 135 | 135 | 130 | 130 | 130 |
| 7) Water absorption (in water of 23° C. for 24 hrs) | wt. % | 0.8 | 0.8 | 0.8 | 0.8 | 0.8 | 0.8 |
| 8) Compressive Creep (amount of strain) | mm | 0.7 | 0.7 | 0.7 | 0.7 | 0.7 | 0.7 |
| 9) Amount of warpage | mm | 0.7 | 1.0 | 0.4 | 0.5 | 0.75 | 0.8 |
| 10) Volumetric shrinkage rate | % | 2.0 | 2.0 | 2.0 | 2.0 | 2.0 | 2.0 |
| 11) Modulus in flexure after water absorption | Kg/cm$^2$ | 22500 | 22500 | 22500 | 22500 | 22500 | 22500 |

TABLE 11

|  | Unit | Example 42 | Example 43 |
|---|---|---|---|
| Properties of forming components |  |  |  |
| 1) Content of apatite type compound-forming component | wt. % | 12.2 | 12.2 |
| 2) Molar ratio of metal element to phosphorus |  | 1.67 | 1.67 |
| 3) Complexing agent added |  | EDTA | En |
| Properties of polyamide resin composition |  |  |  |
| 1) Kind of nylon |  | Ny66 | Ny66 |
| 2) Weight-average molecular weight (Mw) |  | 32000 | 32000 |
| 3) Content of apatite type compound | wt. % | 10.0 | 10.0 |
| 4) Molar ratio of metal element to phosphorus |  | 1.67 | 1.67 |
| 5) Amount of organic substance | part by weight/ 100 parts by weight of apatite type compound | 4.7 | 4.7 |

TABLE 11-continued

|  | Unit | Example 42 | Example 43 |
|---|---|---|---|
| Physical properties of polyamide resin composition |  |  |  |
| 1) Flexural modulus | Kg/cm$^2$ | 47000 | 47000 |
| 2) Flexural strength | Kg/cm$^2$ | 1500 | 1500 |
| 3) Tensile strength | Kg/cm$^2$ | 1000 | 1000 |
| 4) Tensile elongation | % | 10.0 | 10.0 |
| 5) Notched Izod impact strength (23° C.) | Kg · cm/cm | 4.5 | 4.5 |
| 6) Deflection temperature under load (load: 18.6 Kg/cm$^2$) | ° C. | 140 | 130 |
| 7) Water absorption (in water of 23° C. for 24 hrs) | wt. % | 0.7 | 0.8 |
| 8) Compressive Creep (amount of strain) | mm | 0.65 | 0.65 |
| 9) Amount of warpage | mm | 0.6 | 0.6 |
| 10) Volumetric shrinkage rate | % | 1.5 | 1.7 |
| 11) Modulus in flexure after water absorption | Kg/cm$^2$ | 25000 | 25000 |

TABLE 12

|  | Unit | Example 44 | Example 45 | Comp. Ex. 5 | Comp. Ex. 6 |
|---|---|---|---|---|---|
| Properties of forming components |  |  |  |  |  |
| 1) Content of apatite type compound-forming component | wt. % | 12.2 | 12.2 | — | — |
| 2) Molar ratio of metal element to phosphorus |  | 1.67 | 1.67 | — | 13 |

TABLE 12-continued

| | Unit | Example 44 | Example 45 | Comp. Ex. 5 | Comp. Ex. 6 |
|---|---|---|---|---|---|
| Properties of polyamide resin composition | | | | | |
| 1) Kind of nylon | | Ny66 | Ny66 | Ny66 | Ny66 |
| 2) Weight-average molecular weight (Mw) | | 36000 | 36000 | 36000 | 36000 |
| 3) Content of apatite type compound | wt. % | 10.2 | 10.0 | 0 | 0 |
| 4) Molar ratio of metal element to phosphorus | | 1.67 | 1.67 | — | — |
| 5) Amount of organic substance | part by weight/100 parts by weight of apatite type compound | 4.5 | 4.5 | | |
| 6) Additive | | Rubber*1 | GF*2 | Rubber*2 | GF*2 |
| 7) Amount of additive | Wt. % | 20 | 25 | 20 | 25 |
| Physical properties of polyamide resin composition | | | | | |
| 1) Flexural modulus | Kg/cm$^2$ | 27000 | 92000 | 20000 | 80000 |
| 2) Flexural strength | Kg/cm$^2$ | 800 | 1500 | 750 | 1400 |
| 3) Tensile strength | Kg/cm$^2$ | 550 | 1900 | 500 | 1750 |
| 4) Tensile elongation | % | 35 | 8.0 | 30 | 8.0 |
| 5) Notched Izod impact strength (23° C.) | Kg · cm/cm | 20 | 15 | 25 | 12 |
| 6) Deflection temperature under load (load; 18.6 Kg/cm$^2$) | ° C. | 100 | 250 | 65 | 250 |
| 7) Water absorption (in water of 23° C. for 24 hrs) | wt. % | 0.5 | 0.5 | 0.8 | 0.8 |
| 9) Amount of warpage | mm | 0.5 | 2.9 | 1.0 | 5.5 |
| 10) Volumetric shrinkage rate | % | 2.5 | 4.0 | 4.0 | 5.6 |
| 11) Modulus in flexure after water absorption | Kg/cm$^2$ | 18000 | 50000 | 13000 | 40000 |

*1 rubber: "Tuftec M1943" produced by Asahi Chemical Industry Co., Ltd.
*2 GF: "F1756 (10 μm in diameter)" produced by Asahi Fiber Glass Co., Ltd.

INDUSTRIAL APPLICABILITY

The present invention relates to a polyamide resin composition comprising an apatite type compound which has been uniformly and finely dispersed in a polyamide serving as a matrix and at their interface, has been bonded and adhered markedly well to the polyamide. Accordingly, the polyamide resin composition of the present invention has high strength and rigidity and is excellent in toughness and moreover is drastically improved in low water absorption, rigidity upon water absorption, heat resistance, creep resistance, low warpage, dimensional stability and moldability and formability and is therefore useful as industrial materials such as mechanical parts or electrical/electronic parts.

What is claimed is:

1. A polyamide resin composition obtained by a process comprising:

mixing a polyamide-forming component with an apatite compound-forming component; and allowing to proceed polymerization of a polyamide and synthesis of an apatite compound, wherein said polyamide resin composition contains 0.5 to 50 wt. % of the apatite compound and when eluted with a phenol solvent and filtered, leaves 1 to 100 parts by weight of residual organic substances per 100 parts by weight of said apatite compound, said polyamide resin being selected from the group consisting of polycaprolactam (nylon 6), polytetramethylene adipamide (nylon 46), polyhexamethylene adipamide (nylon 66), polyhexamethylene sebacamide (nylon 610), polyhexamethylene dodecamide (nylon 612), polyundecamethylene adipamide (nylon 116), polyundecalactam (nylon 11), polydodecalactam (nylon 12), polytrimethylhexamethylene terephthalamide (nylon TMHT), polyhexamethylene isophthalamide (nylon 6I), polynonanemethylene terephthalamide (9T), polyhexamethylene terephthalamide (6T), polybis (4-aminocyclohexyl)methane dodecamide (nylon PACM12), polybis(3-methyl-aminocyclohexyl) methane dodecamide (nylondimethyl PACM12), polymethaxylylene adipamide (nylon MXD6) and polyundecamethylene hexahydroterephthalamide (nylon 11T (H)) and polyamide copolymers each containing at least two different polyamide components of said polyamide resins, and mixtures thereof.

2. The polyamide resin composition according to claim 1, wherein said polyamide has a weight-average molecular weight of 10,000 to 1,000,000.

3. The polyamide resin composition according to claim 1, wherein said organic substances comprise at least a polyamide.

4. The polyamide resin composition according to claim 1, wherein said apatite compound has an average particle size not greater than 1 μm.

5. The polyamide resin composition according to claim 1, wherein the molar ratio of the metal element(s) to phosphorus, both constituting the apatite compound, is from 0.9 to 10.0.

6. The polyamide resin composition according to claim 4, wherein said apatite compound is a crystalline apatite compound which has a (002) plane peak at a diffraction angle (2θ) of 25.5° to 26.5° and a (300) plane peak at a diffraction angle (2θ) of 32.5° to 33.5° as observed by wide-angle X-rays (CuKα: wavelength λ=1.542 Å) scattering.

7. The polyamide resin composition according to claim 4, wherein said apatite compound is represented by the following formula:

$$A_{10-z}(HPO_4)_z(PO_4)_{6-z}(X)_{2-z} \cdot nH_2O$$

Wherein $0 \leq z < 2$, $0 \leq n \leq 16$, A represents a metal element and X represents an anion or an anionic compound.

8. The polyamide resin composition according to claim 5, wherein the metal element is at least one metal in Group 2A of the periodic table.

9. The polyamide resin composition according to claim 5, wherein the metal element is calcium.

10. A process for preparing a polyamide resin composition, which comprises mixing a polyamide-forming component with an apatite compound-forming component, allowing to proceed polymerization of a polyamide and synthesis of an apatite compound, to give a composition in which an apatite compound having an average particle size not greater than 1 μm is dispersed in a polyamide having a weight-average molecular weight of 10,000 to 1,000,000.

11. The process for preparing a polyamide composition according to claim 10, wherein said polyamide-forming component comprises at least one selected from the group consisting of polymerizable amino acids, polymerizable lactams polymerizable salts of diamines and dicarboxylic acids, and polymerizable oligomers of these compounds.

12. The process for preparing a polyamide resin composition according to claim 10, wherein said apatite compound-forming component comprises a phosphoric acid-based metal compound or a mixture of a phosphoric acid-based metal compound and a non-phosphoric acid-based metal compound.

13. The process for preparing a polyamide resin composition according to claim 10, wherein the molar ratio of the metal element(s) to phosphorus in said apatite compound-forming component is from 0.9 to 10.

14. The process for preparing a polyamide resin composition according to claim 10, wherein said apatite compound is a crystalline apatite compound having a (002) plane peak at a diffraction angle (2θ) of 25.5° to 26.5° and a (300) plane peak at a diffraction angle (2θ) of 32.5° to 33.5° as observed by wide-angle X-ray (CuKα: wavelength λ=1.542 Å) scattering.

15. The process for preparing a polyamide resin composition according to claim 10, wherein said apatite compound is represented by the following formula:

$$A_{10-z}(HPO_4)_z(PO_4)_{6-z}(X)_{2-z} \cdot nH_2O$$

wherein $0 \leq z < 2$, $0 \leq n \leq 16$, A represents a metal element and X represents an anion or an anionic compound.

16. The process for preparing a polyamide resin composition according to claim 12, wherein the metal element is at least one metal in Group 2A of the periodic table.

17. The process for preparing a polyamide resin composition according to claim 12, wherein the metal element is calcium.

18. The process for preparing a polyamide resin composition according to claim 10, wherein said polymerization of the polyamide and said synthesis of the apatite compound are carried out at a temperature of 40° C. to 300° C.

19. A polyamide resin composition which contains 0.5 to 50 wt. % of an apatite compound and which, when eluted with a phenol solvent and filtered, leaves 1 to 100 parts by weight of residual organic substances per 100 parts by weight of said apatite compound;

wherein the polyamide resin composition is prepared by a process which comprises mixing a polyamide-forming component with an apatite compound-forming component, allowing to proceed polymerization of a polyamide and synthesis of an apatite compound, to give a composition in which an apatite compound having an average particle size not greater than 1 μm is dispersed in a polyamide having a weight-average molecular weight of 10,000 to 1,000,000.

* * * * *